United States Patent [19]
Nagayama

[11] Patent Number: 6,109,849
[45] Date of Patent: Aug. 29, 2000

[54] TEE NUT

[75] Inventor: Yutaka Nagayama, Kishiwada, Japan

[73] Assignee: Nagayama Electronic Industry Co., Ltd., Wakayama, Japan

[21] Appl. No.: 09/221,546

[22] Filed: Dec. 28, 1998

[30] Foreign Application Priority Data

Jul. 16, 1998 [JP] Japan .................................. 10-202108

[51] Int. Cl.[7] ............................. F16B 37/04; F16B 39/00
[52] U.S. Cl. ......................... 411/181; 411/176; 411/113; 411/183
[58] Field of Search .................................. 411/176, 179, 411/180, 181, 183, 113

[56] References Cited

U.S. PATENT DOCUMENTS

| | | |
|---|---|---|
| 3,515,028 | 6/1970 | Patton . |
| 4,439,078 | 3/1984 | Dessouroux ......................... 411/183 X |
| 4,541,761 | 9/1985 | Bryce, Jr. . |
| 5,195,854 | 3/1993 | Nagatana . |
| 5,238,344 | 8/1993 | Nagayama . |
| 5,348,432 | 9/1994 | Nagayama . |
| 5,429,466 | 7/1995 | Nagayama . |
| 5,564,873 | 10/1996 | Ladouceur et al. ................. 411/179 X |
| 5,618,144 | 4/1997 | Leistner . |
| 5,863,164 | 1/1999 | Leistner .............................. 411/183 X |

FOREIGN PATENT DOCUMENTS

| | | |
|---|---|---|
| 77858 | 5/1983 | European Pat. Off. ............... 411/176 |
| 4206821 | 1/1993 | Germany . |
| 4401746 | 11/1994 | Germany . |
| 1157734 | 7/1969 | United Kingdom . |

OTHER PUBLICATIONS

JIS B 1052:1998; JIS Japanese Industrial Standard; pp. 1–39.

*Primary Examiner*—B. Dayoan
*Attorney, Agent, or Firm*—W. F. Fasse; W. G. Fasse

[57] ABSTRACT

A tee nut includes a shaft portion and a flange portion outwardly extending from a first end of the shaft portion. The shaft portion includes a step around the periphery thereof at on an intermediate position of its axial length, a forward end side cylindrical portion having a hollow cylindrical shape located between the second end of the shaft portion and the step, and a base end side enlarged cylindrical portion having inner and outer diameters larger than those of the forward end side cylindrical portion. The forward end side cylindrical portion includes a predeterminate caulked part formed over a prescribed length from the second end and a female screw forming part between the step and the predeterminate caulked part. The length of the forward end side hollow cylindrical portion including the female screw forming part can be relatively reduced, and hence the length of the female screw forming part is not increased beyond the minimum necessary to comply with a standard such as ISO standard even if the shaft portion is very long. Thus, no additional working is required in a threading step using a tap and the productivity of the tee nut can be improved.

16 Claims, 20 Drawing Sheets

TEE NUT

BACKGROUND OF THE INVENTION

1. Field of the Invention

The present invention relates to a tee nut having a hollow shaft portion provided with a female screw, i.e. a female thread, on its inner peripheral surface and a flange portion outwardly extending from an end of the shaft portion, and more particularly, it relates to a rivet type tee nut including a predeterminate caulked part on an end of the shaft portion opposite to the flange portion.

2. Description of the Prior Art

For example, U.S. Pat. No. 5,238,344 or 5,348,432 discloses a conventional tee nut having a thin part to be caulked on its shaft portion. FIGS. 14A and 14B show a tee nut 11 described in U.S. Pat. No. 5,238,344, which is integrally obtained by performing sheet metal working on a ferrous metal plate, for example, and includes a shaft portion 12 and a flange portion 13 outwardly extending from a first end of the shaft portion 12.

The shaft portion 12 is in the form of a hollow cylinder having a uniform outer diameter and has a predeterminate caulked part 14 on a second end opposite to the first end, while a female screw, i.e. a female thread 15a is formed on the inner peripheral surface of a female screw forming part 15 excluding the predeterminate caulked part 14. The predeterminate caulked part 14 is smaller in thickness than the portion provided with the female screw forming part 15. Thus, the shaft portion 12 can be threaded from either the first or second end thereof for forming the female screw 15a.

The flange portion 13 is provided with two pawls 16, which are formed by partially inwardly crushing the outer peripheral edge of the flange portion 13 to project toward the second end of the shaft portion 12 in opposition to each other at 180°. Notches 17 having substantially semicircular sections are left on the outer peripheral edge of the flange portion 13, due to such formation of the pawls 16.

The tee nut 11 is used as shown in FIG. 16A, for example. Referring to FIG. 16A, the shaft portion 12 is first inserted in an object 19 of a resin material or wood previously provided with a through hole 18 and then the predeterminate caulked part 14 is caulked with a caulker in this state for forming a caulked part 14a on a surface of the object 19. At the same time, the pawls 16 are made to bite into the other surface of the object 19. Thus, the tee nut 11 is completely fixed to the object 19.

FIGS. 15A and 15B show a tee nut 31 described in U.S. Pat. No. 5,348,432, which is integrally obtained by performing sheet metal working on a ferrous metal plate, for example, similarly to the aforementioned tee nut 11, and includes a shaft portion 32 and a flange portion 33 outwardly extending from a first end of the shaft portion 32. The tee nut 31 has a female screw forming part 35 provided with a female screw 36 and a predeterminate caulked part 34 on the inner periphery of the shaft portion 32. This tee nut 31 is different in structure from the tee nut 11 in a point that two pairs of pawls 37, 38, 39 and 40 extending from a first end to a second end are arranged on the outer periphery of the flange portion 33 to be opposed to each other along the diametral direction of the flange portion 33, and the flange portion 33 has a substantially octagonal shape as a whole.

Such a tee nut 31, which can be automatically supplied by being smoothly moved along a feed track of a nut fixer for fixing the same to an object, is generally called a hopper feed tee nut. For example, U.K. Patent No. 1,157,734 describes an exemplary hopper feed tee nut in detail.

FIG. 15B shows the aforementioned feed track 43 with phantom lines. The feed track 43 includes a pair of guide rails 44 and 45 having C-shaped sections, which are symmetrically arranged to be opposed to each other. The guide rails 44 and 45 receive the flange portion 33 while positioning the pawls 37 to 40 therebetween, for moving the tee nut 31 along the feed track 43 in a prescribed attitude. The feed track 43 is often bent (the bent portion is not shown) for bringing the tee nut 31 into a desired attitude and aligning the shaft portion 32 with a hole provided on an object (not shown).

This tee nut 31 is used in a mode similar to that for the tee nut 11 as shown in FIG. 16B, for example. The shaft portion 32 of the tee nut 31 is inserted in a through hole 18 of an object 19 and then the predeterminate caulked part 34 is caulked with a caulker in this state for forming a caulked part 34a on one surface of the object 19. At the same time, the pawls 37 to 40 are made to bite into the other surface of the object 19.

In such a mounted state of the tee nut 31, the pawls 37 to 40 inhibit the tee nut 31 from rotating with respect to the object 19 while the flange portion 34 and the caulked part 34a hold the object 19 therebetween for preventing displacement of the tee nut 31 from the through hole 18. Therefore, the tee nut 31 is strongly fixed to the object 19 and semi-permanently kept in this fixed state.

The female screw forming part 15 or 35 of the aforementioned conventional tee nut 11 or 31 is threaded with a so-called bent tap, for example. FIGS. 17 and 18 show a bent tap 71 continuously threading a plurality of intermediate products 73 for tee nuts.

In this tapping step, the bent tap 71 is held in a hollow rotary spindle 70 for rotating at about 1000 to 3000 rpm. The plurality of intermediate products 73 for tee nuts are continuously fed along a chute 72, and a stopper 74 is driven to guide the intermediate products 73 one by one to an end of the bent tap 71 and a push rod 75 presses each intermediate product 73 against the bent tap 71 for starting the threading process. Since the bent tap 71 rotates in the direction of arrow Y with the rotary spindle 70, each threaded tee nut is moved in a direction Z along the bent tap 71 and pushed by the subsequent tee nut to be continuously moved after passing through a cutting edge portion of the bent tap 71 held by a tap cover 76 from both sides. Consequently, the tee nut reaching the other end of the bent tap 71 through the inner side of the rotary spindle 70 is discharged from an opening 70a of the rotary spindle 70. Thus, formation of a female screw or threading is completed to provide a desired tee nut.

The shaft portion 12 or 32 of each of the aforementioned conventional tee nuts 11 and 31 has a substantially constant outer diameter along the overall length thereof and the region excluding the predeterminate caulked part 14 or 34 has a substantially constant inner diameter along the overall length. Thus, a female screw having a threading groove shape agreeing with a standard such as JIS (Japanese Industrial Standard) is formed along the overall length of this region. The female screw of this type of tee nut can serve its function even if the shaft portion has a large length, so far as the length of the female screw having the groove shape agreeing with the standard is at least substantially identical to the root diameter thereof. For example, a hexagon nut provided with a female screw having a nominal diameter d in the range of 1.6 to 39 mm with a nominal height of at least 0.8 d (complete thread length of at least 0.6 d) is defined as "normal height nut" in relation to B1052 (corresponding to ISO 898-2: 1980 and ISO 898-6: 1988) of JIS.

When the structure of the aforementioned conventional tee nut 11 or 31 is applied to a tee nut having a relatively long shaft portion, therefore, the length of the female screw forming part 15 or 35 increases beyond necessity and hence additional working is required for the threading step with a bent tap, which deteriorates the productivity of manufacturing of the tee nut 11 or 31.

In the step of forming the female screw with the bent tap 71 shown in FIGS. 17 and 18, further, feeding of the threaded tee nut is hindered at a bent portion of the bent tap 71 if a hollow cylindrical portion of the intermediate product for the tee nut to be provided with the female screw has a long and thin inner periphery, which makes it impossible to form the female screw with the bent tap 71.

SUMMARY OF THE INVENTION

An object of the present invention is to provide a structure of a tee nut having a predeterminate caulked part, in which the length of a female screw forming region agreeing with a standard is not increased beyond necessity even if a shaft portion of the tee nut has a large length.

Another object of the present invention is to provide a structure of a tee nut having a relatively long shaft portion, which enables application of tapping using a bent tap for forming a female screw.

The inventive tee nut attaining the aforementioned objects includes a shaft portion and a flange portion outwardly extending from a first end of the shaft portion, which are made of an integral metal material. The shaft portion includes a step provided on an intermediate position in the axial direction thereof, a forward end side cylindrical portion located between a second end opposite to the first end and the step, and a base end side enlarged cylindrical portion, having an inner periphery larger than the inner diameter of the forward end side cylindrical portion and an outer periphery larger than the outer diameter of the forward end side cylindrical portion, located between the step and the flange portion. The forward end side cylindrical portion includes a predeterminate caulked part formed over a prescribed length from the first end and a female screw forming part, at least partially formed with a female screw or threads therein, located on a region closer to the step than the predetermined caulked part and having an inner diameter smaller than that of the predeterminate caulked part. The step is located at the intermediate position, which is displaced axially away from the flange portion and the end part of the base end side enlarged cylindrical portion adjoining the flange portion.

In the tee nut according to the present invention having the aforementioned structure, the length of the forward end side hollow cylindrical portion including the predeterminate caulked part and the female screw forming part can be reduced as compared with that in the conventional tee nut by providing the step on the shaft portion and providing the base end side enlarged cylindrical portion to be closer to the flange portion than the step. Even if the shaft portion has a large length, therefore, the length of the female screw forming part is not increased beyond necessity but can be set at the minimum necessary value agreeing with a standard such as that under ISO (International Organization for Standardization). Therefore, no additional working is required in a threading step with a tap, and the productivity of the tee nut can be improved.

Further, the female screw forming part is relatively reduced in length and the base end side enlarged cylindrical portion having a larger diameter is provided to be closer to the flange portion so that the tee nut can be fed over a bent portion of a bent tap that is employed for cutting or forming the female screw on the tee nut having the longer shaft portion. Thus, the bent tap can be used for forming the female screw on the tee nut having a relatively long shaft portion.

In a preferred embodiment of the tee nut according to the present invention, the base end side enlarged cylindrical portion is in the form of a hollow cylinder having inner and outer diameters larger than those of the forward end side cylindrical portion. When the tee nut having such a structure is driven into a prepared hole of a plate having a diameter substantially identical to the outer diameter of the forward end side cylindrical portion, the base end side enlarged cylindrical portion is pushed into the prepared hole in a press-fitted state so that no clearance is defined between the outer periphery of the forward end side cylindrical portion and the inner periphery of the prepared hole, whereby the tee nut is strongly fixed to the plate.

In another preferred embodiment of the tee nut according to the present invention, the outer periphery of the enlarged cylindrical portion has a polygonal shape as viewed from the axial direction of the shaft portion. The enlarged cylindrical portion having such a polygonal outer peripheral shape serves as a detent when press-fitted in the prepared hole of the plate. Even if the flange portion has no projection or pawl for serving as a detent, therefore, the tee nut can be fixed to the plate so as to prevent relative rotation thereof.

Alternatively, a projection projecting toward the second end may be provided on the flange portion so that this projection bites into the plate for serving as detent means in a state driven into the plate or the like.

The inventive idea of providing the step on the shaft portion is applicable not only to a structure without a female screw on the inner periphery of the base end side enlarged cylindrical portion located between the step and the flange portion but also to the structure of a tee nut having a female screw extending along the inner periphery of the base end side enlarged cylindrical portion continuously from the female screw forming part of the forward end side cylindrical portion.

Further, the inventive idea of providing the step on the shaft portion is applicable not only to a tee nut having a structure provided with a predeterminate caulked part having an inner diameter larger than that of a female screw forming part and formed to be smaller in thickness than the female screw forming part but also to a tee nut provided with a predeterminate caulked part having an inner diameter larger than that of a female screw forming part and an outer diameter larger than that of the female screw forming part, for example.

In still another preferred embodiment of the present invention, the tee nut further includes a concave groove annularly provided on the outer periphery of the shaft portion in the vicinity of the boundary between the predeterminate caulked part and the female screw forming part. According to such a structure, the tee nut can be readily detached from a product into which the same is driven when the product has reached the end of its useful life cycle, by pushing an end of the female screw forming part with a punch or the like from the caulked forward end and breaking the tee nut along the concave groove. Thus, the tee nut attached to the used product can be relatively readily recovered.

In a further preferred embodiment of the tee nut according to the present invention, the thread of the female screw formed on the inner periphery of the shaft portion is partially irregularized. Such a partially irregularized female screw locks a bolt in a fitted state, thereby preventing the bolt from loosening.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

Embodiment 1

Figure 1A:
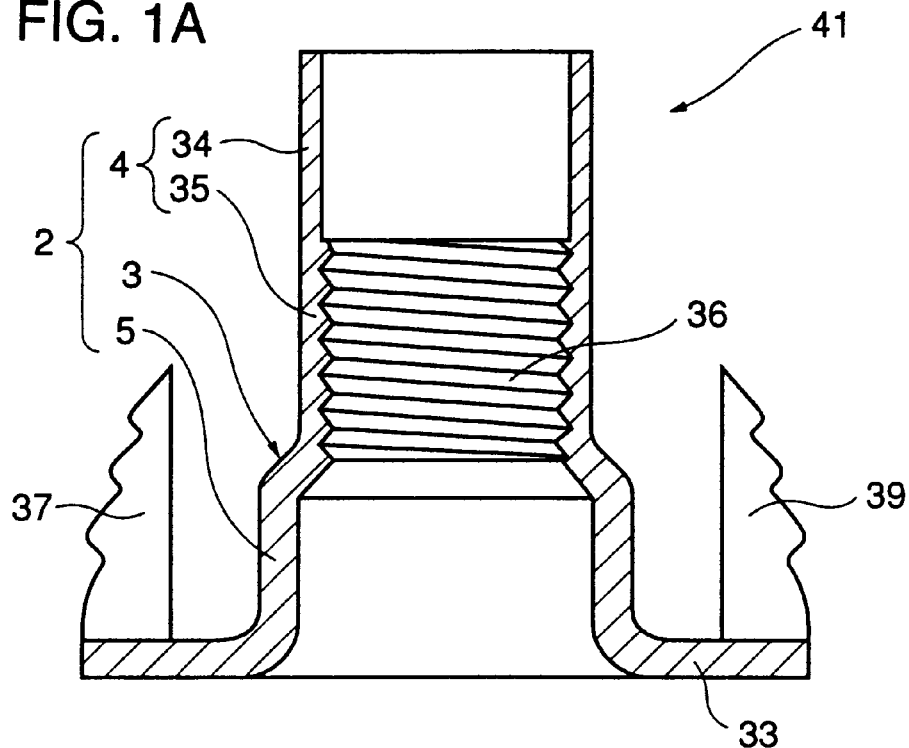
FIG. 1A is a central longitudinal sectional view of a tee nut 41 according to an embodiment 1 of the present invention.
Figure 1B:
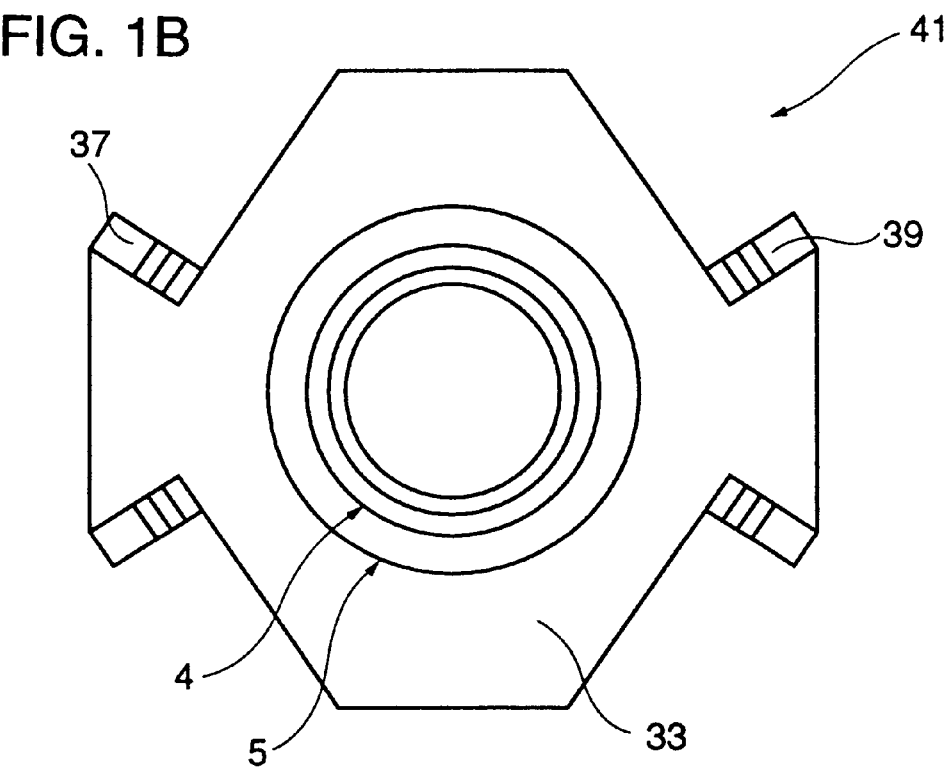
FIG. 1B is a plan view of the tee nut 41.
Figure 2A:
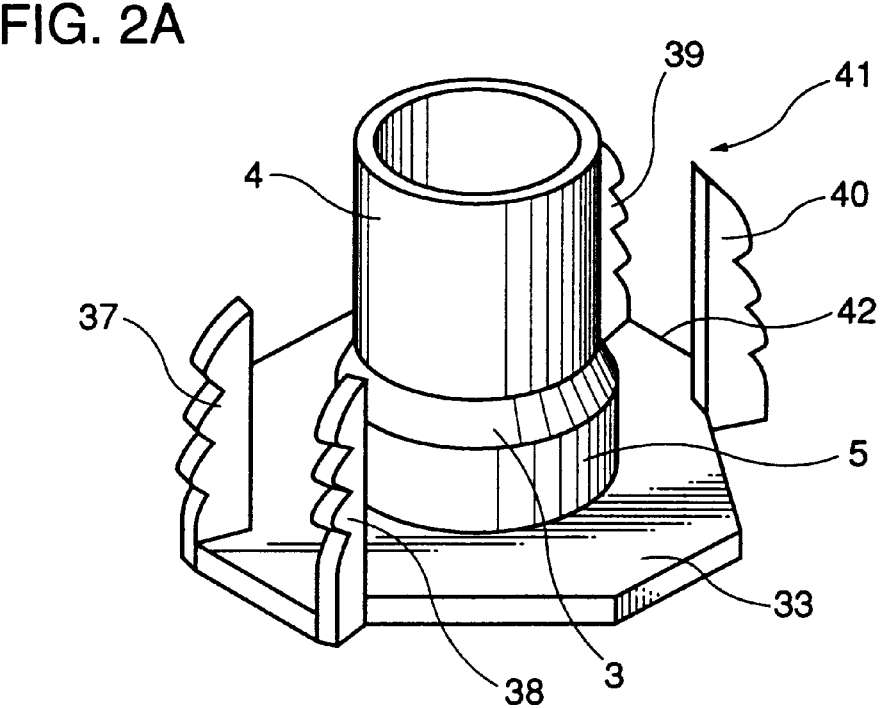
FIG. 2A is a perspective view of the tee nut 41 shown in FIG. 1.
Figure 15A:
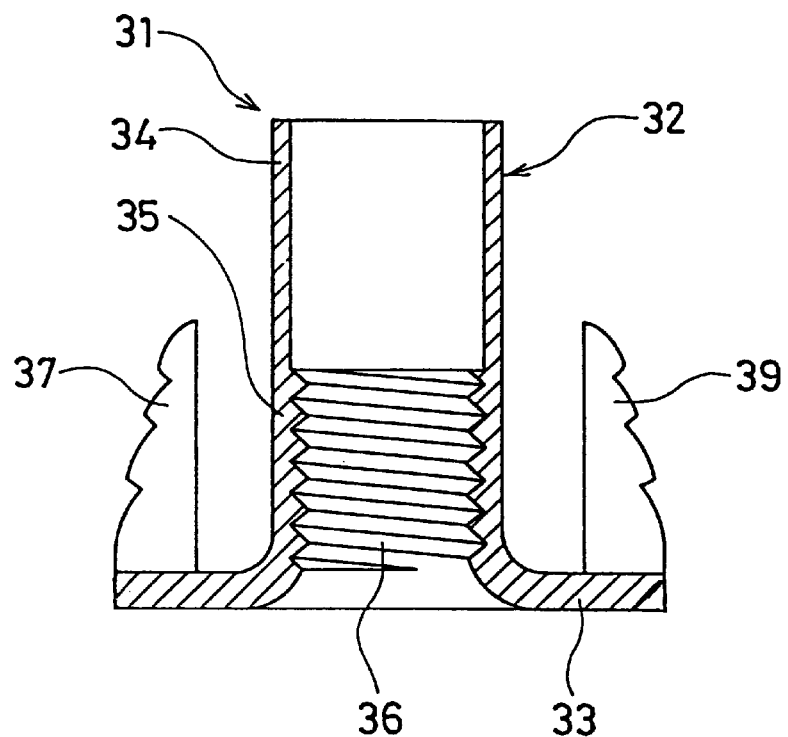
FIG. 15A is a central longitudinal sectional view showing a conventional tee nut 31, described in U.S. Pat. No. 5,348,532, having an octagonal flange portion and a shaft portion provided with a thin part to be caulked.
Figure 15B:
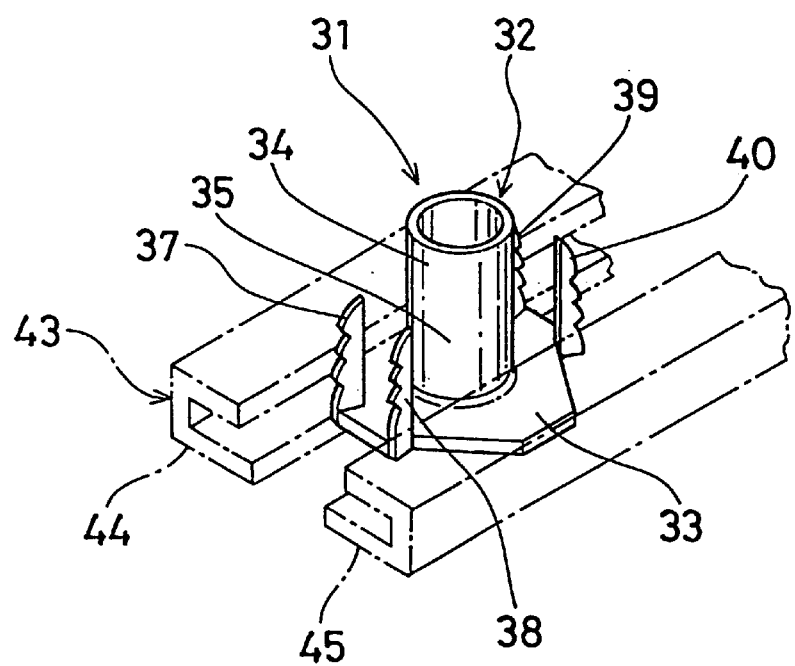
FIG. 15B is a perspective view of the tee nut 31 shown in FIG. 15A.
Figure 16A:
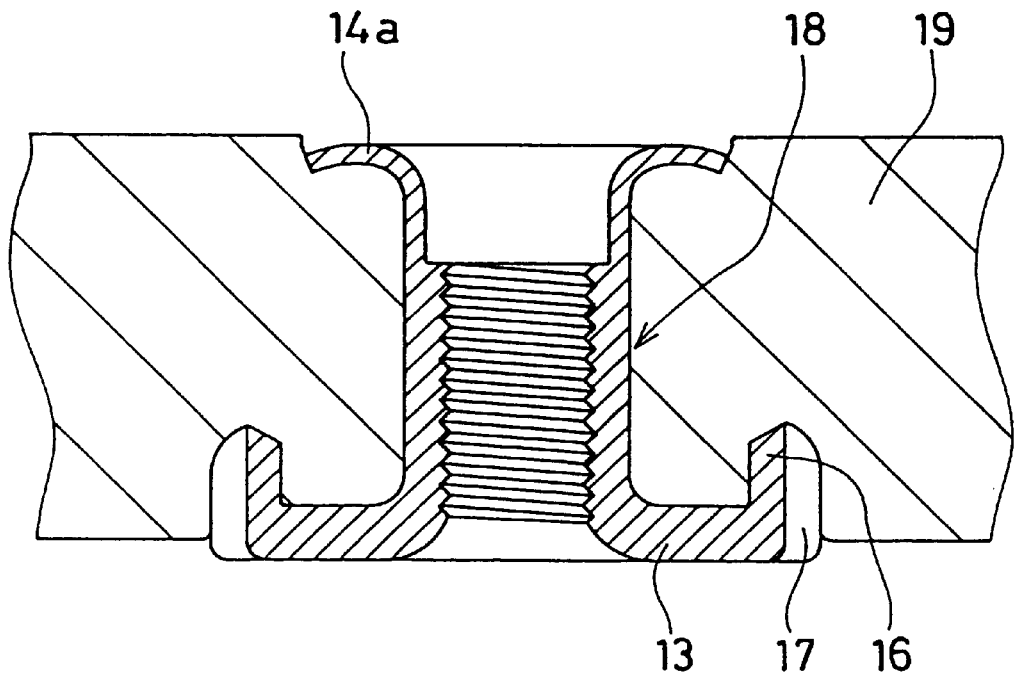
FIG. 16A is a sectional view showing the conventional tee nut 11 shown in FIGS. 14A and 14B in a state caulked and fixed to a through hole 18 of an object 19.
Figure 16B:
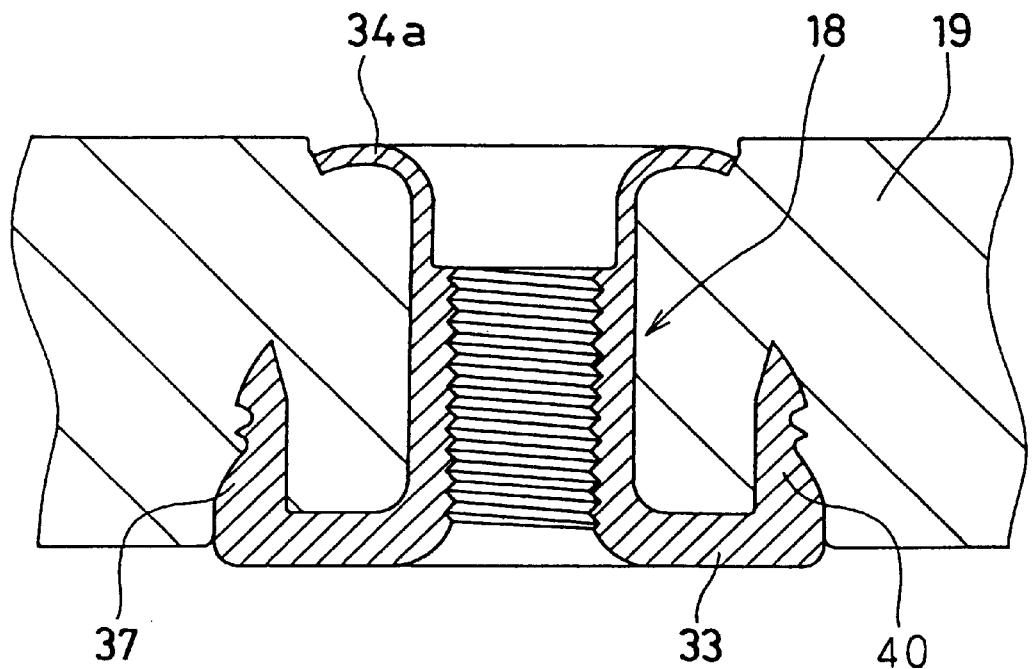
FIG. 16B is a sectional view showing the conventional tee nut 31 shown in FIGS. 15A and 15B in a state caulked and fixed to a through hole 18 of an object 19.
Figure 17:
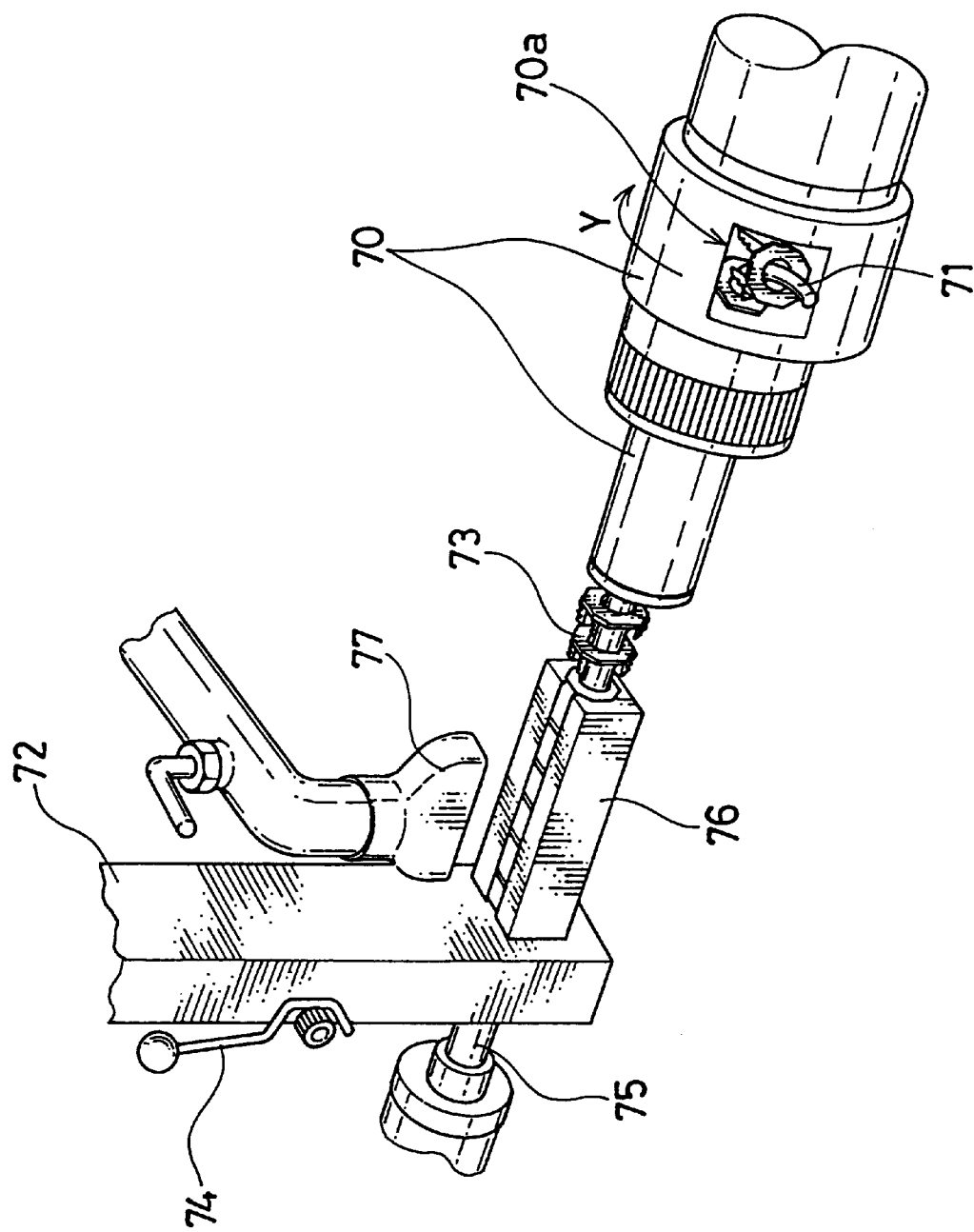
FIG. 17 is a perspective view showing a principal part of a tapping apparatus for forming female screws on the inner peripheries of shaft portions of intermediate products of tee nuts.
Figure 18:
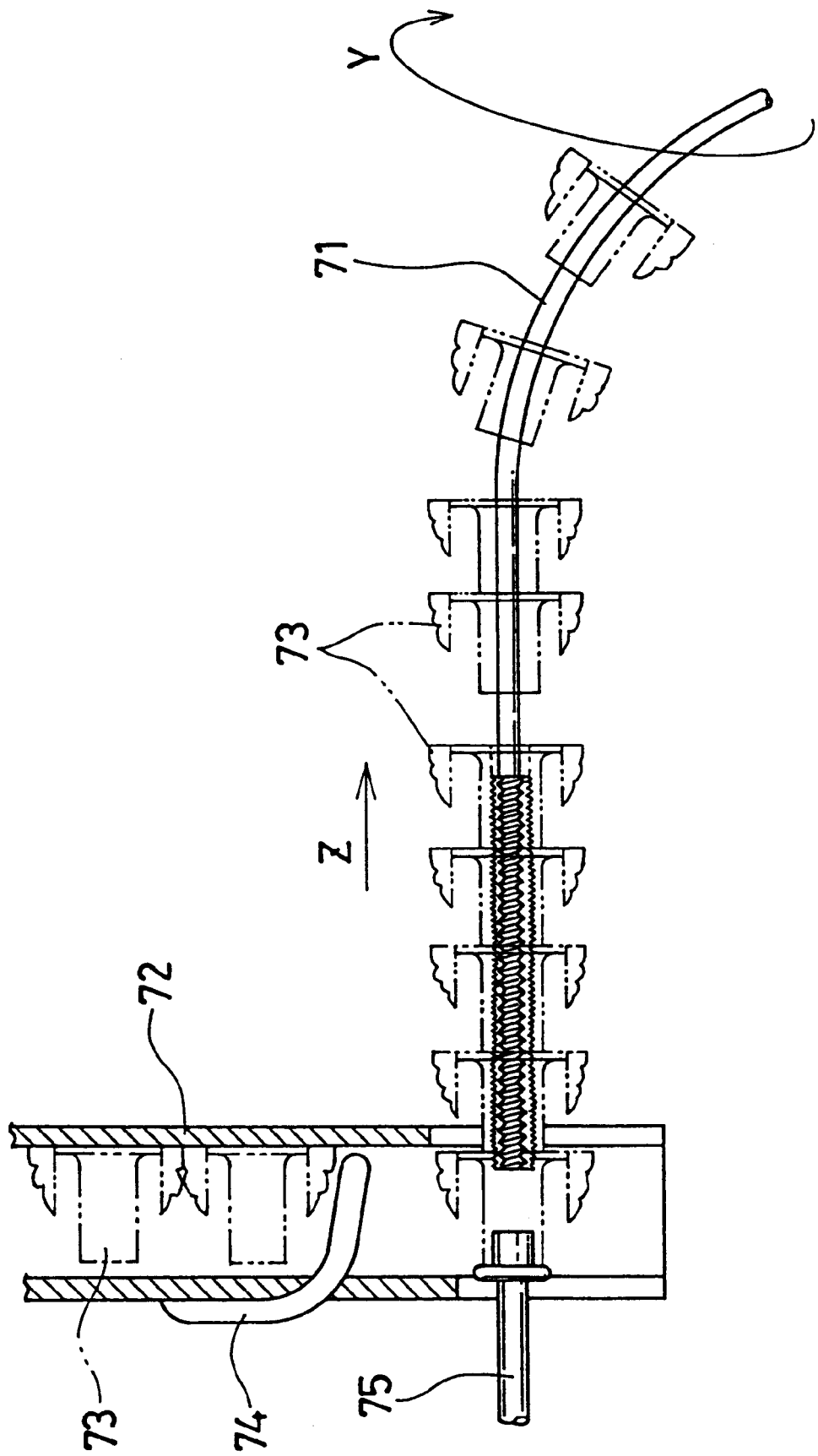
FIG. 18 illustrates the tee nuts successively threaded by a bent tap in the tapping apparatus shown in FIG. 17.

As shown in FIGS. 1A, 1B and 2A, the shapes of a shaft portion 2 and a flange portion 33 of a tee nut 41 according to an embodiment 1 of the present invention are similar to those of the shaft portion 32 and the flange portion 33 of the conventional tee nut 31 disclosed in U.S. Pat. No. 5,348,432 and described above with reference to FIGS. 15A and 15B, and hence common elements are denoted by the same reference numerals, to omit redundant description.

The tee nut 41 according to this embodiment is different from the conventional tee nut 31 in that the shaft portion 2 has a step 3 along the overall periphery of a female screw forming part 35 in the vicinity of an end close to but displaced from the flange portion 33, so that the tee nut 41 has a forward end side hollow cylindrical portion 4 on the side of the step 3 toward the second end and a hollow base end side enlarged cylindrical portion 5 on the side of the step 3 toward the flange portion.

According to the tee nut 41 having such a structure, the length of the forward end side hollow cylindrical portion 4 including the predeterminate caulked part 34 and the female screw forming part 35 can be reduced as compared with that in the conventional tee nut 31 due to the step 3 provided on the shaft portion 2 and the base end side enlarged cylindrical portion 5 provided to be closer to the flange portion 33 than the step 3. Even if the shaft portion 2 has a large length, therefore, the length of the female screw forming part 35 is not increased beyond necessity but can be set at the minimum necessary value agreeing with a standard such as ISO standard. Thus, no additional working is required in a threading step with a tap, and the productivity of manufacturing the tee nut 41 can be improved.

Figure 4A:
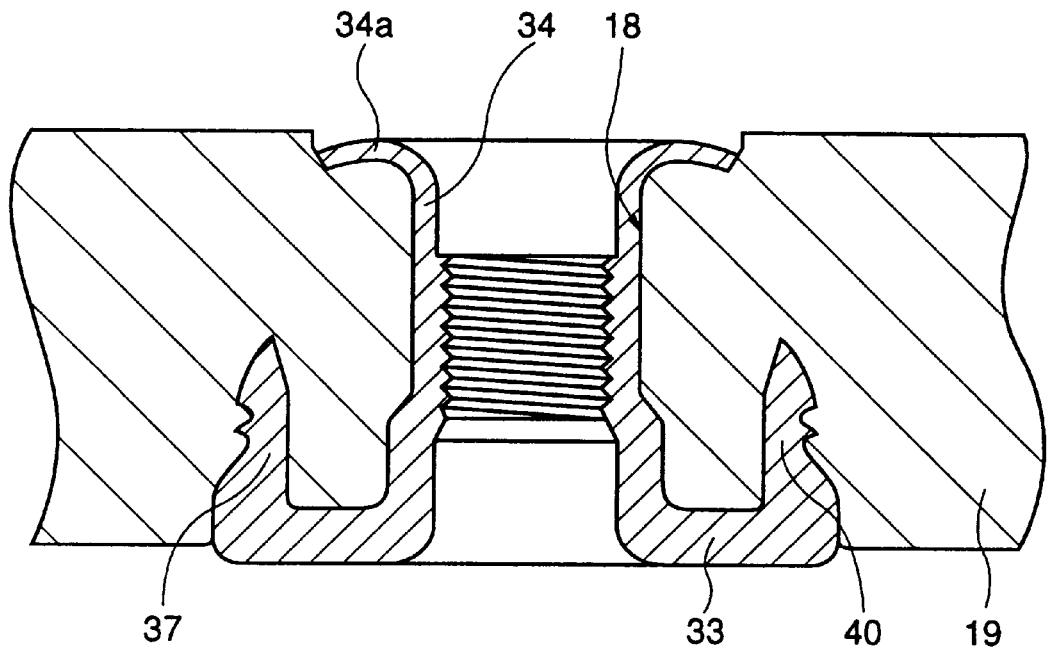
FIG. 4A is a sectional view showing the tee nut 41 according to the embodiment 1 of the present invention in a state caulked and fixed to a through hole 18 of an object 19.

When in use, the shaft portion 2 of the tee nut 41 according to this embodiment is inserted in a through hole 18 of an object 19 such as a wooden plate as shown in FIG. 4A, for example, and then the predeterminate caulked part 34 is caulked with a caulker for forming a caulked part 34a on a surface of the object 19. At the same time, pawls 37 to 40 bite into the other surface of the object 19. In the example shown in FIG. 4A, the inner diameter of the through hole 18 of the object 19 is set to be substantially identical to the outer diameter of the forward end side hollow cylindrical portion 4, and the base end side enlarged cylindrical portion 5 is press-fitted into the through hole 18 when the tee nut 41 is driven into the object 19. Thus, no clearance is defined between the outer periphery of the forward end side hollow cylindrical portion 4 and the inner periphery of the through hole 18 while the base end side enlarged cylindrical portion 5 is press-fitted into the through hole 18, for strongly fixing the tee nut 41 to the object 19.

While the tee nut 41 shown in FIGS. 1A, 1B and 2A is provided with the flange portion 33 having a substantially octagonal shape, the flange portion 33 may alternatively have a substantially square or rectangular shape with pawls provided on four corner portions thereof respectively, to implement a hopper feed tee nut attaining the objects of the present invention.

Figure 2B:
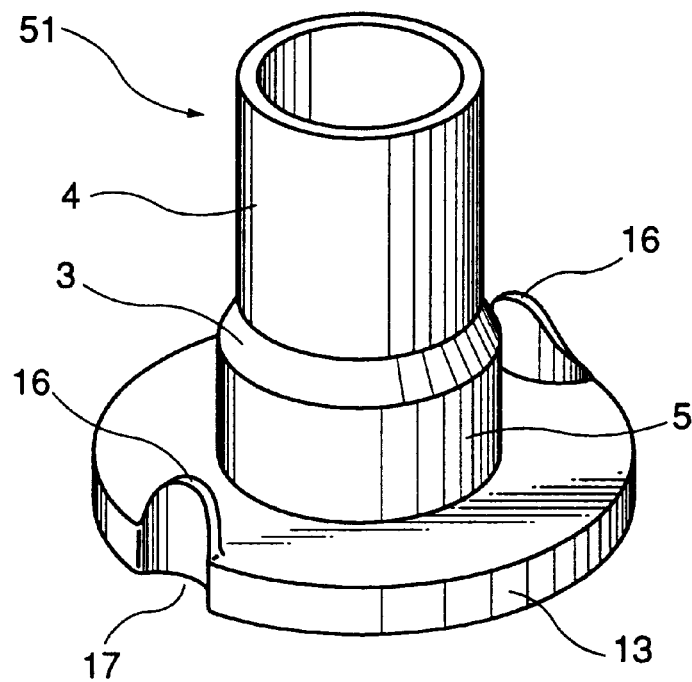
FIG. 2B is a perspective view of a tee nut 51 according to a modification of the embodiment 1 of the present invention.
Figure 4B:
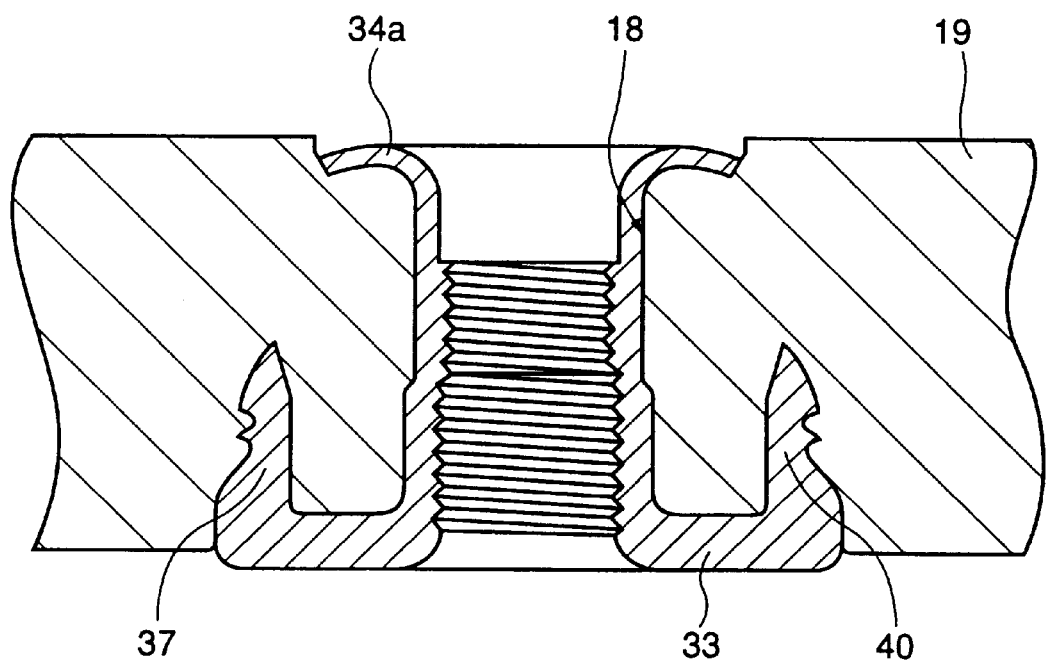
FIG. 4B is a sectional view showing the tee nut 61 according to the embodiment 2 of the present invention in a state caulked and fixed to a through hole 18 of an object 19.

While the tee nut 41 shown in FIGS. 1A, 1B and 2A is provided with the four pawls 37 to 40 formed by partially bending the outer periphery of the flange portion 33 upward, a structure similar to that of the shaft portion 2 of the tee nut 41 can be applied to the aforementioned conventional tee nut described in U.S. Pat. No. 5,238,344 as shown in FIG. 2B illustrating a tee nut 51 having relatively short pawls 16 and 17 formed by partially plastically deforming the outer periphery of a flange portion 13 toward a shaft portion 2. When in use, this tee nut 51 is driven into a through hole 18 of an object 19 to be press-fitted and fixed thereto as shown in FIG. 4B, for attaining an effect similar to that of the tee nut 41.

Embodiment 2

A tee nut 61 according to an embodiment 2 of the present invention is now described with reference to FIG. 3A. The tee nut 61 according to this embodiment is different from the tee nut 41 according to the embodiment 1 only in that a female screw is formed also on the inner periphery of a base end side hollow cylindrical portion 5a located between a step 3 of a shaft portion 2 and a flange portion 33. The length of a female screw forming part 35 closer to a predeterminate caulked part 34 than the step 3 can be set at the minimum necessary value within an allowable range defined in a standard such as ISO standard due to the structure of the tee nut 61, for precisely finishing a female screw in specifications satisfying the requirement of the standard only on the female screw forming part 35 while forming a relatively rough female screw having a thread diameter larger than the standard on the inner periphery of the base end side hollow cylindrical portion 5a. Thus, the female screws can be readily formed on the tee nut 61 having the relatively long shaft portion 2 as compared with the conventional tee nut having the female screw precisely finished along the overall length of the region for forming the same, thereby attaining improvement of the productivity. Further, the strength of the tee nut 61 is increased due to the female screw formed on the inner periphery of the base end side hollow cylindrical portion 5a.

Figure 3A:
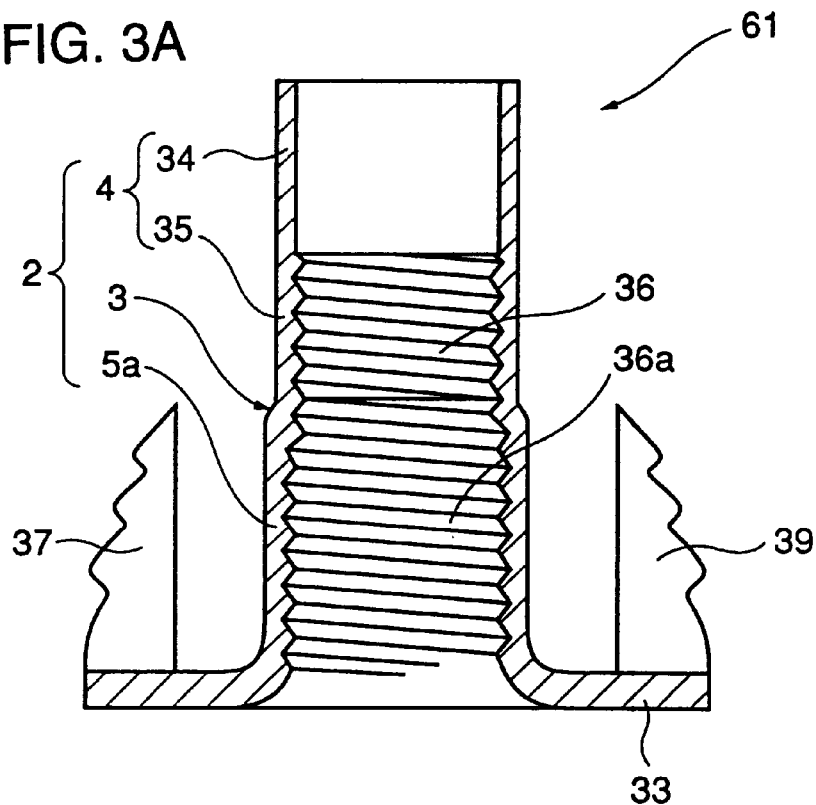
FIG. 3A is a central longitudinal sectional view of a tee nut 61 according to an embodiment 2 of the present invention.
Figure 3B:
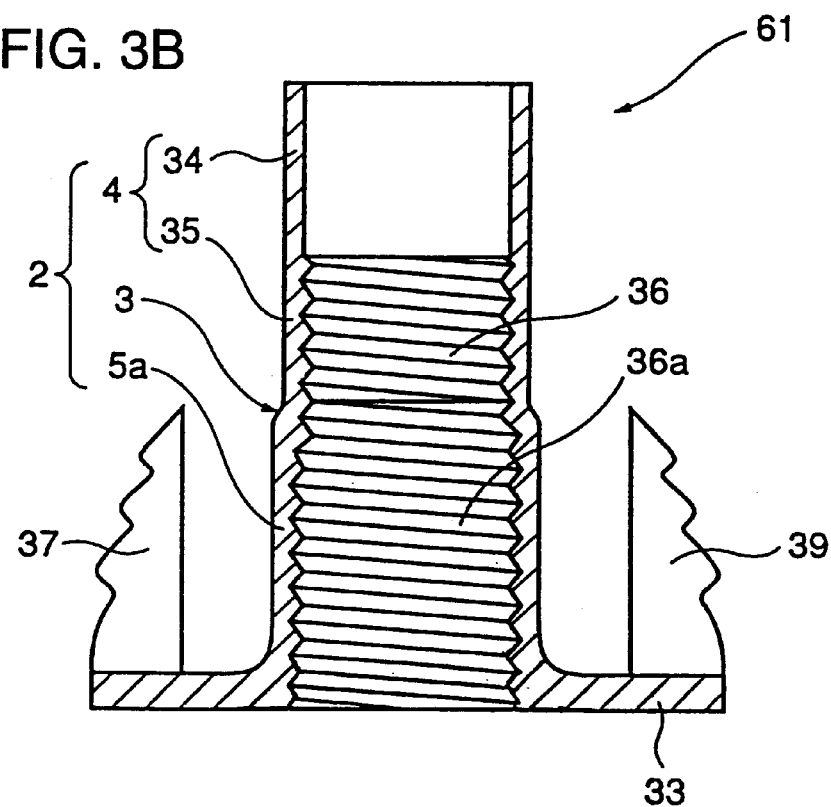
FIG. 3B is a central longitudinal sectional view of a modification of the tee nut 61.

While the base end side hollow cylindrical portion 5a of the tee nut 61 according to this embodiment shown in FIG. 3A has a lower portion continuous with the flange portion 33 with a substantially arcuately bent longitudinal section so that no female screw is formed on this portion, this portion may alternatively be substantially rectangularly formed so that the female screw is formed up to the lower end of the inner periphery of the base end side hollow cylindrical portion 5a, as shown in FIG. 3B.

Embodiment 3

Figure 5A:
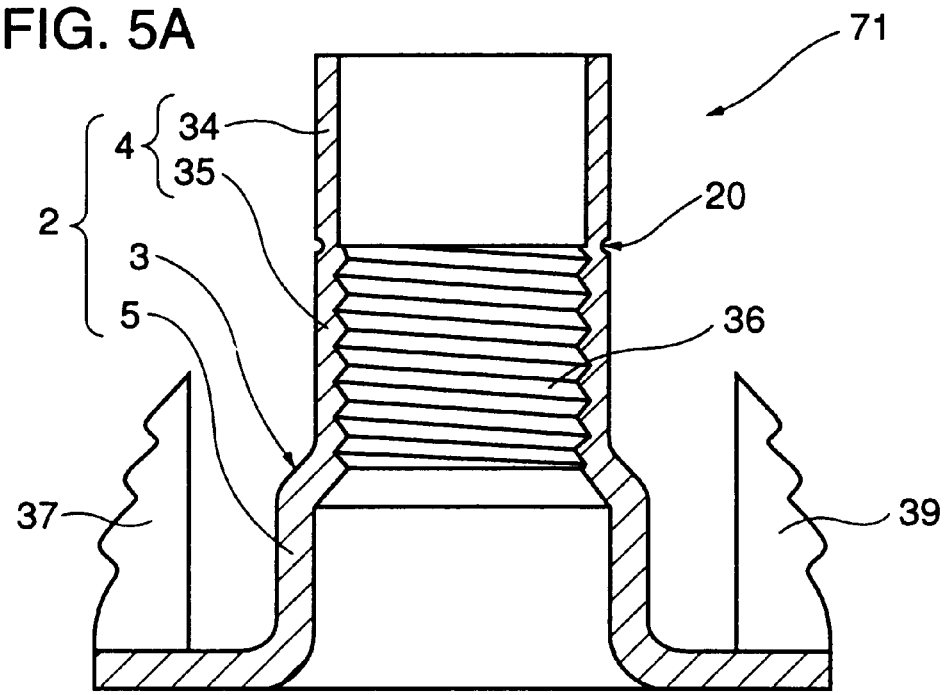
FIG. 5A is a central longitudinal sectional view of a tee nut 71 according to an embodiment 3 of the present invention.

A tee nut 71 according to an embodiment 3 of the present invention is now described with reference to FIG. 5A. The tee nut 71 according to this embodiment is different from the tee nut 41 according to the embodiment 1 only in that an annular groove 20 is provided on a base end side hollow cylindrical portion 5 of a shaft portion 2 along the overall periphery in the vicinity of the boundary between a predeterminate caulked part 34 and a female screw forming part 35. This groove 20 may have a U-shaped or V-shaped cross-sectional shape in place of the semicircular cross-sectional shape shown in FIG. 5A, which is properly selected in response to the material for the tee nut 71, working properties thereof or mechanical properties such as tensile strength.

Figure 6A:
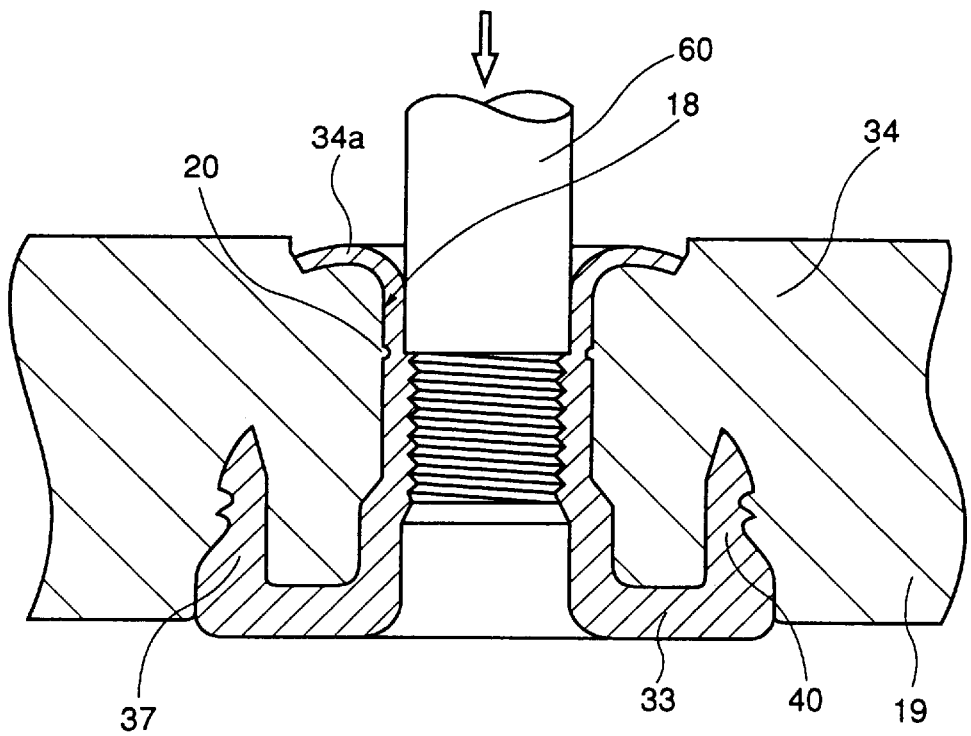
FIG. 6A is a sectional view showing a jig 60 press-fitted into a caulked part 34a of the tee nut 71 according to the embodiment 3 of the present invention, caulked and fixed to an object 19, for illustrating an exemplary method of detaching the tee nut 71 from the object 19.

A shaft portion 2 of the tee nut 71 according to this embodiment having the aforementioned structure is first inserted in an object 19 of a resin material or wood previously provided with a through hole 18 as shown in FIG. 6A, and then the predeterminate caulked part 34 is caulked with a caulker for forming a caulked part 34a on a surface of the object 19 in this state. At the same time, pawls 37 to 40 bite into the other surface of the object 19 for strongly fixing the tee nut 71 to the object 19.

In a product formed by the object 19, a male screw is fitted with and fastened to a female screw provided on the female screw forming part 35 while the tee nut 71 is caulked and fixed to the object 19, for joining another member with the object 19. When the male screw is fastened to the female screw of the female screw forming part 35, the fastening force of the male screw acts mainly on the female screw forming part 35 as compressive force. In general, therefore, no remarkable tensile stress is caused on the shaft portion 2 of the tee nut 71. Thus, substantially no deterioration of fixing strength results from reduction of strength caused by the groove 20 provided on the shaft portion 2.

Figure 6B:
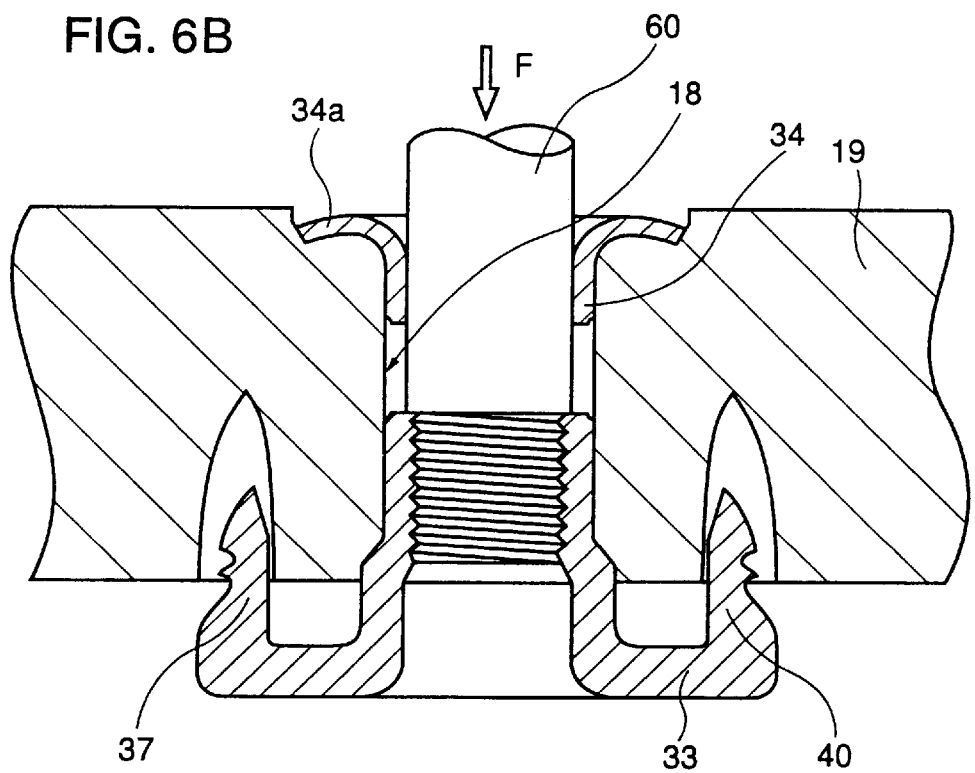
FIG. 6B is a sectional view showing the tee nut 71 broken along a concave part 20 by pressing force F of the jig 60 and vertically separated into two parts in the detaching method illustrated in FIG. 6A.

A method of separating the tee nut 71 from the object 19 to which the tee nut 71 had been caulked and fixed is used up or at the end of its life for recovering the same for recycling is now described with reference to FIGS. 6A and 6B. First, the lower end of a columnar jig 60 having an outer diameter slightly larger than the inner diameter of the predeterminate caulked part 34 in the state not yet caulked is press-fitted into the tee nut 71 from the side of the caulked part 34a, as shown in FIG. 6A. When the lower end of the jig 60 comes into contact with a step defining the boundary between the predeterminate caulked part 34 and the female screw forming part 35, the upper end of the jig 60 is knocked with a hammer or the like for applying the force F shown in FIG. 6B. This force F results in stress concentration on a part of the outer periphery of the shaft portion 2 provided with the groove 20 in the vicinity of the boundary between the predeterminate caulked part 34 and the female screw forming part 35 having the smallest thickness, to cause remarkable tensile stress. Consequently, the tee nut 71 is broken along the groove 20 into two parts as shown in FIG. 6B, and the lower end of the jig 60 pushes down the lower half of the tee nut 71 including the female screw forming part 35 and the flange portion 33 for detaching the same from the object 19. When the jig 60 is extracted upward, the upper half of the tee nut 71 including the caulked part 34a is detached from the through hole 18 of the object 19 in a state engaged with the jig 60.

Thus, the tee nut 71 according to this embodiment can be readily detached from the object 19 so that the object 19 can be readily separated and recovered after the product to which the tee nut 71 has been caulked and fixed is used up, thereby facilitating recycling of the object 19.

Figure 5B:
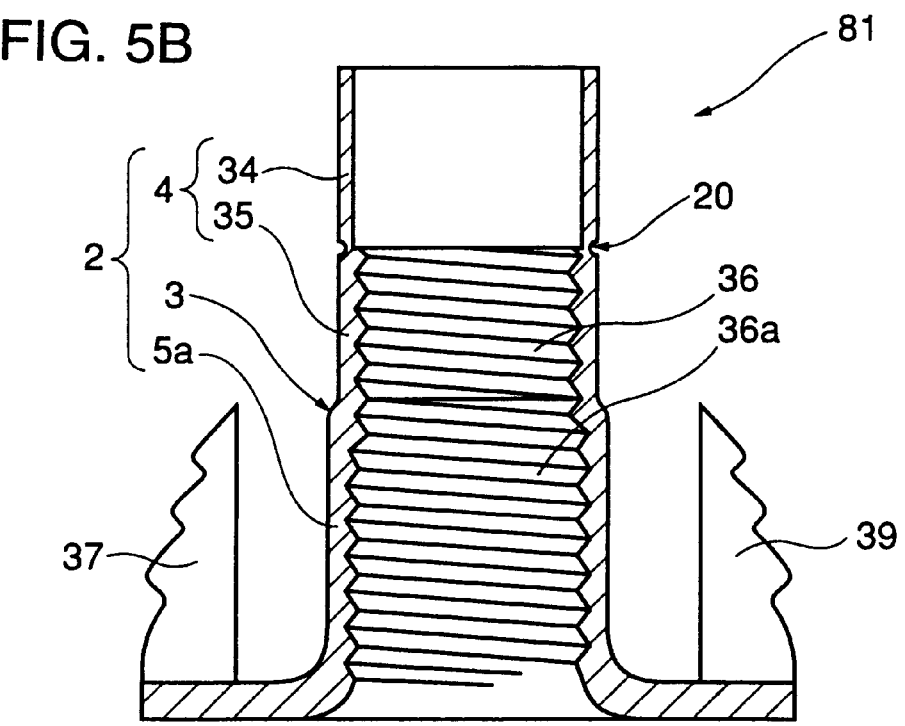
FIG. 5B is a central longitudinal sectional view of a tee nut 81 according to a modification of the embodiment 3 of the present invention.

The structure of this embodiment provided with the groove 20 is also applicable to the tee nut 61 according to the embodiment 2 shown in FIGS. 3A and 3B as in a tee nut 81 shown in FIG. 5B, for obtaining an effect similar to that of the tee nut 71. The inner peripheral lower end of a base end side hollow cylindrical portion 5a of the tee nut 81 shown in FIG. 5B may be substantially perpendicularly formed similarly to the tee nut 61 shown in FIG. 3B, so that a female screw is formed up to the inner peripheral lower end of the base end side hollow cylindrical portion 5a.

Figure 20A:
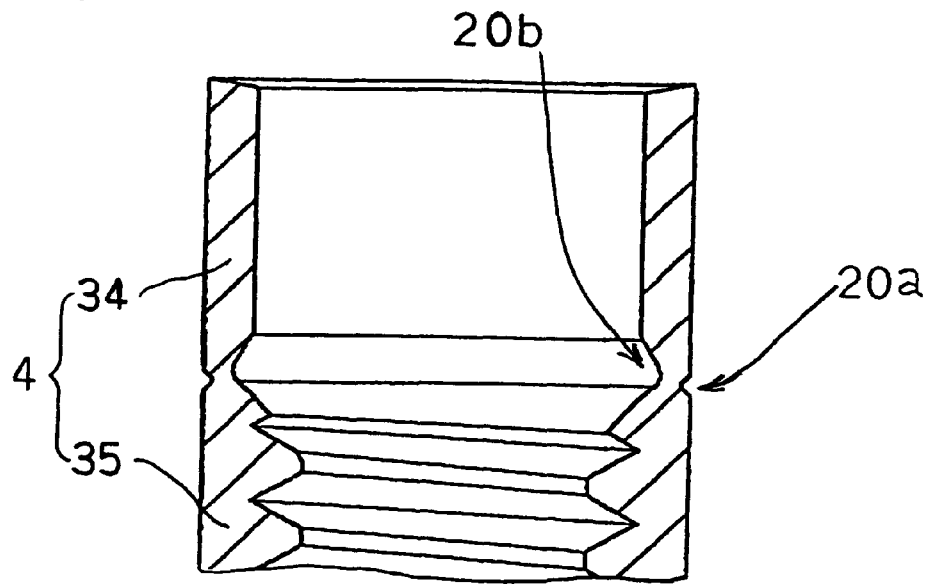
FIG. 20A is a partially enlarged sectional view showing a modification of the tee nut 71 according to the embodiment 3 of the present invention.
Figure 20B:
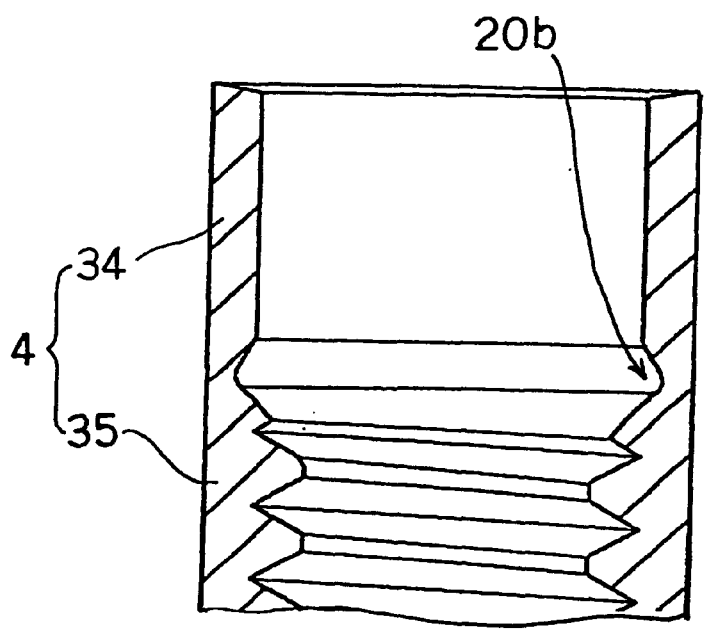
FIG. 20B is a partially enlarged sectional view showing another modification of the tee nut 71.

While the groove 20 is provided on the outer periphery of the shaft portion 2 in the vicinity of the boundary between the predeterminate caulked part 34 and the female screw forming part 35 in this embodiment, grooves 20a and 20b may alternatively be provided on opposite positions of the outer periphery and the inner periphery of the shaft portion in the vicinity of the boundary between the predeterminate caulked part 34 and the female screw forming part 35 as shown in FIG. 20A, or a groove 20b may be provided only on the inner periphery of the shaft portion in the vicinity of the boundary between the predeterminate caulked part 34 and the female screw forming part 35 as shown in FIG. 20B, in order to attain a similar object.

Embodiment 4

Figure 7A:
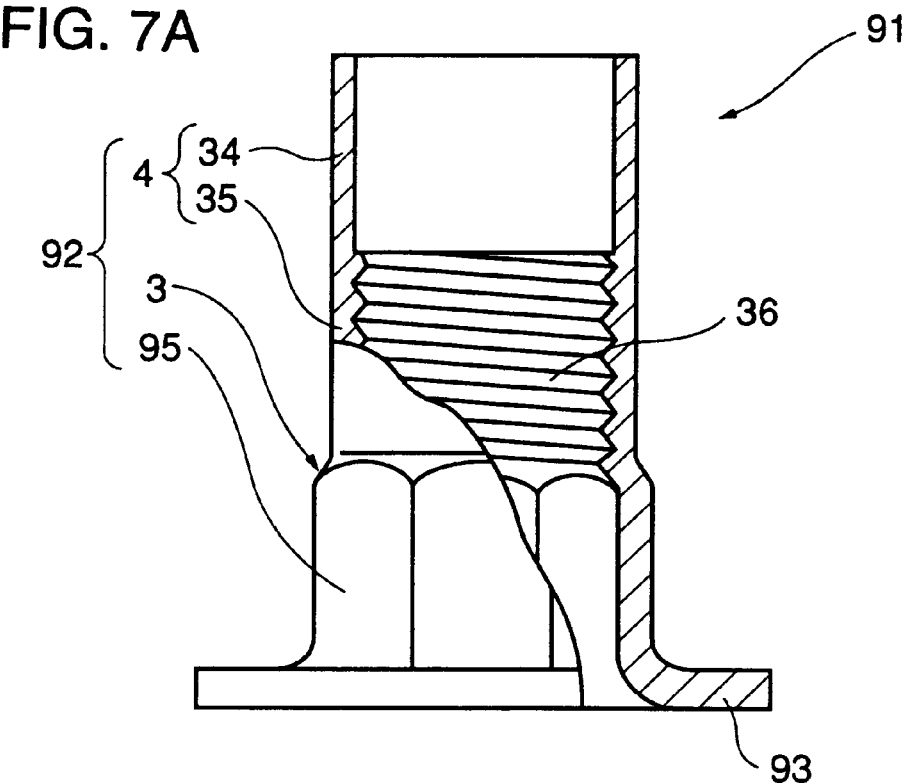
FIG. 7A is a central longitudinal sectional view of a tee nut 91 according to an embodiment 4 of the present invention.
Figure 7B:
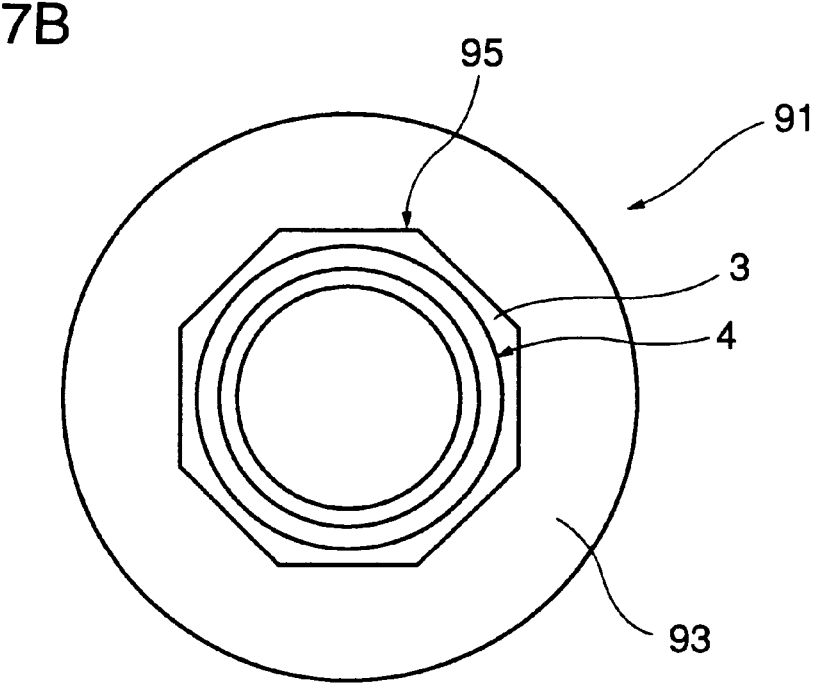
FIG. 7B is a plan view of the tee nut 91 shown in FIG. 7A.
Figure 9A:
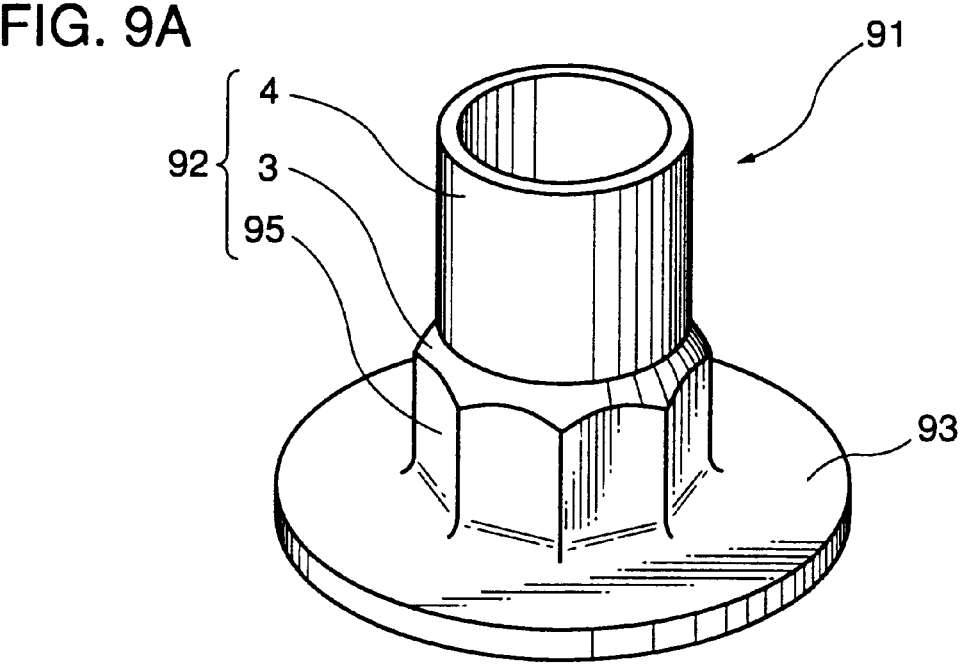
FIG. 9A is a perspective view of the tee nut 91 shown in FIGS. 7A and 7B.

A tee nut 91 according to an embodiment 4 of the present invention is now described with reference to FIGS. 7A, 7B and 9A. The tee nut 91 according to this embodiment is in common with the tee nut 41 according to the embodiment 1 in that the same has a step 3 on its shaft portion 92 with a predeterminate caulked part 34 and a female screw forming part 35 provided on a forward end side hollow cylindrical portion 4. The tee nut 91 is different from the tee nut 41 in that a base end side enlarged cylindrical portion 95 extending from the step 3 toward a flange portion 93 has a substantially equilateral octagonal shape rather than a hollow cylindrical shape as viewed from the axial direction and the flange portion 93 has a discoidal shape.

When the tee nut 91 having such a structure is driven into a through hole of a plate substantially identical in diameter to the forward end side hollow cylindrical portion 4 and the base end side enlarged cylindrical portion 95 having a substantially equilateral octagonal shape is press-fitted to bite into the plate, this portion serves as a detent. Consequently, the tee nut 91 can be reliably fixed to the plate to prevent relative rotation thereof even if the flange portion 93 has a flat discoidal shape provided with no pawls.

Figure 8A:
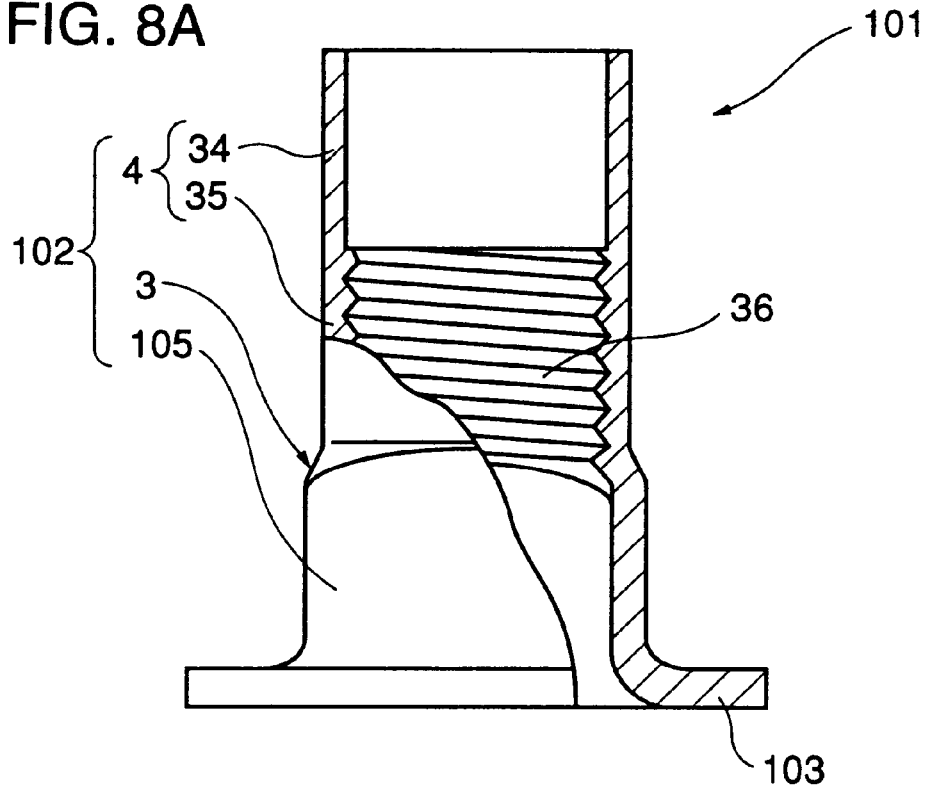
FIG. 8A is a central longitudinal sectional view of a tee nut 101 according to a modification of the embodiment 4 of the present invention.
Figure 8B:
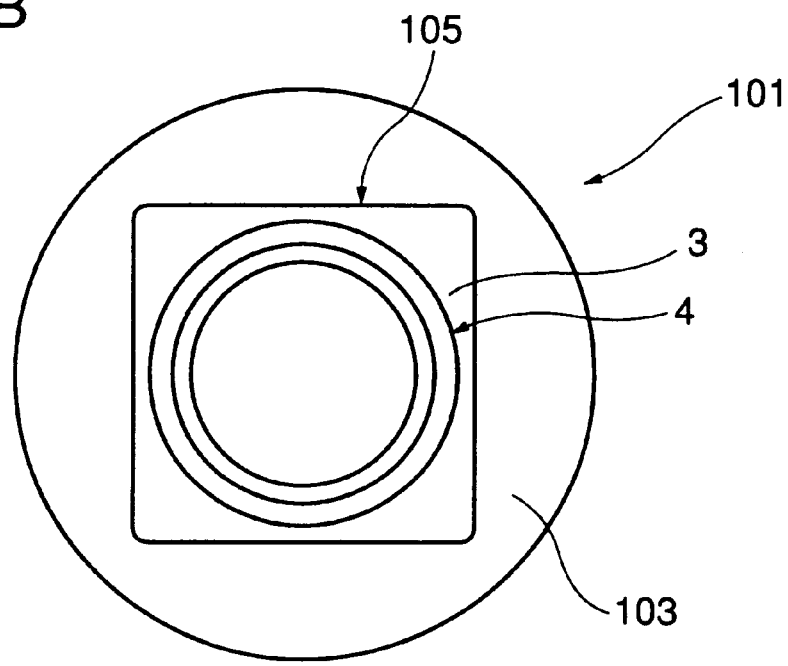
FIG. 8B is a plan view of the tee nut 101 shown in FIG. 8A.
Figure 9B:
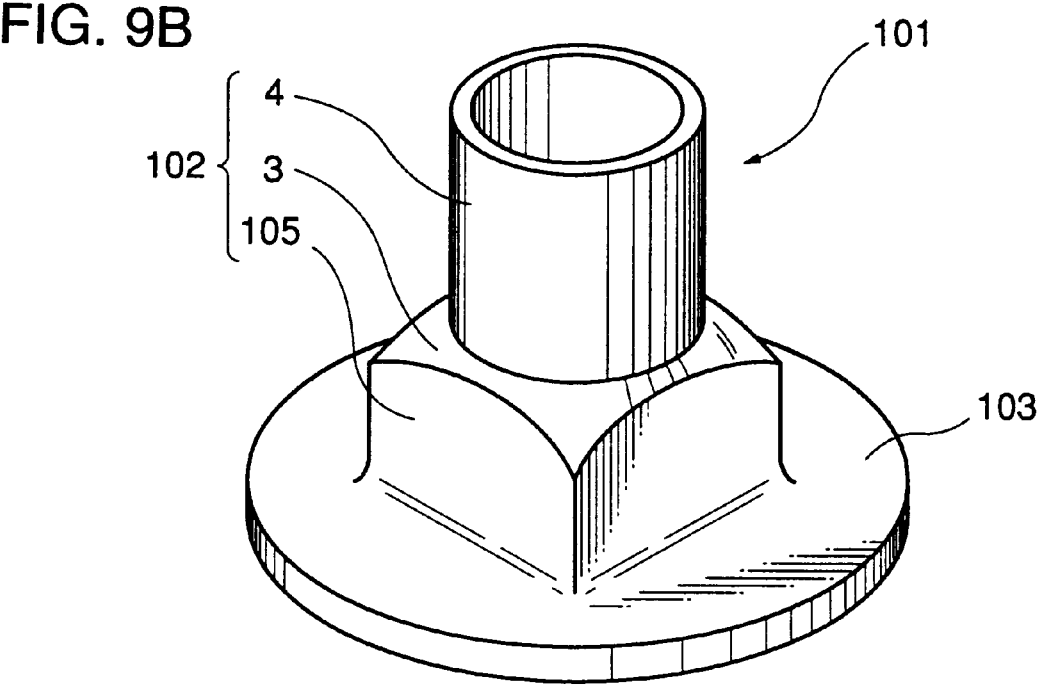
FIG. 9B is a perspective view of the tee nut 101 shown in FIGS. 8A and 8B.

While the base end side enlarged cylindrical portion 95 is formed to have a substantially equilateral octagonal shape as viewed from the axial direction in the tee nut 91, the embodiment is not restricted to this but a base end side enlarged cylindrical portion 105 can be formed to have a substantially square shape as viewed from the axial direction, as in a tee nut 101 shown in FIGS. 8A, 8B and 9B, for example. Alternatively, the base end side enlarged cylindrical portion 105 may have still another polygonal shape such as a hexagonal shape as viewed from the axial direction.

While the step 3 is provided along the overall outer periphery of the shaft portion 2 in the tee nut according to each of the aforementioned embodiments, the step 3 may not necessarily be provided along the overall outer periphery of the shaft portion 2 in case of providing the base end side enlarged cylindrical portion 95 for serving as a detent in a used state as in the embodiment 4. The base end side enlarged cylindrical portion 95 can serve as a detent in the used state when the same has a step at least on a part of its outer periphery closer to the flange portion 93 to be enlarged as compared with the forward end side cylindrical portion 4 in this part.

Embodiment 5

Figure 10A:
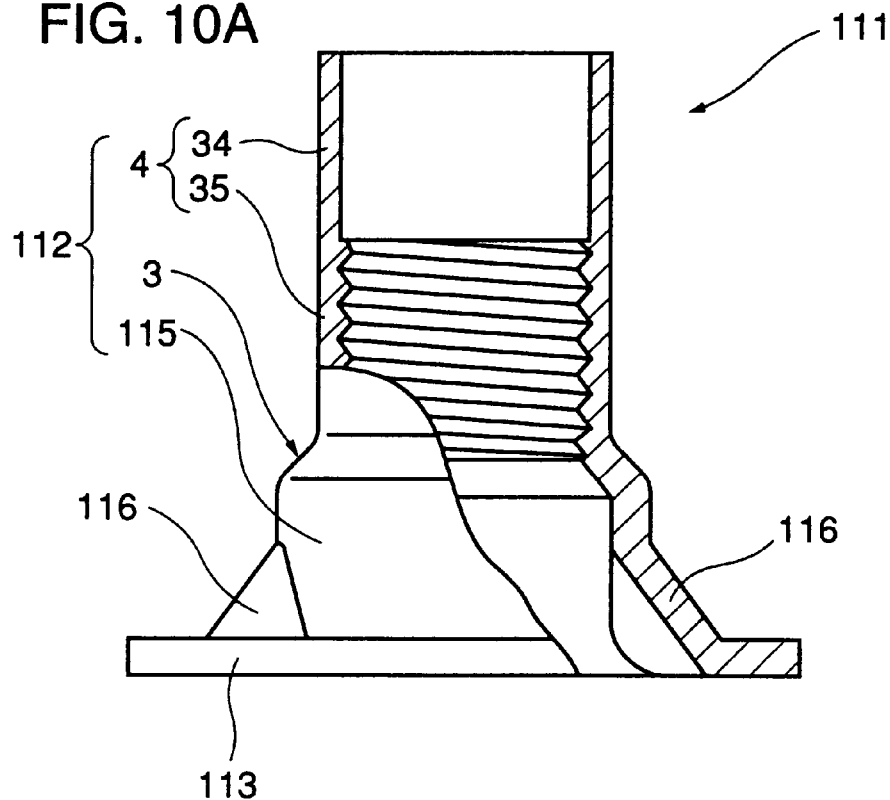
FIG. 10A is a central longitudinal sectional view of a tee nut 111 according to an embodiment 5 of the present invention.
Figure 10B:
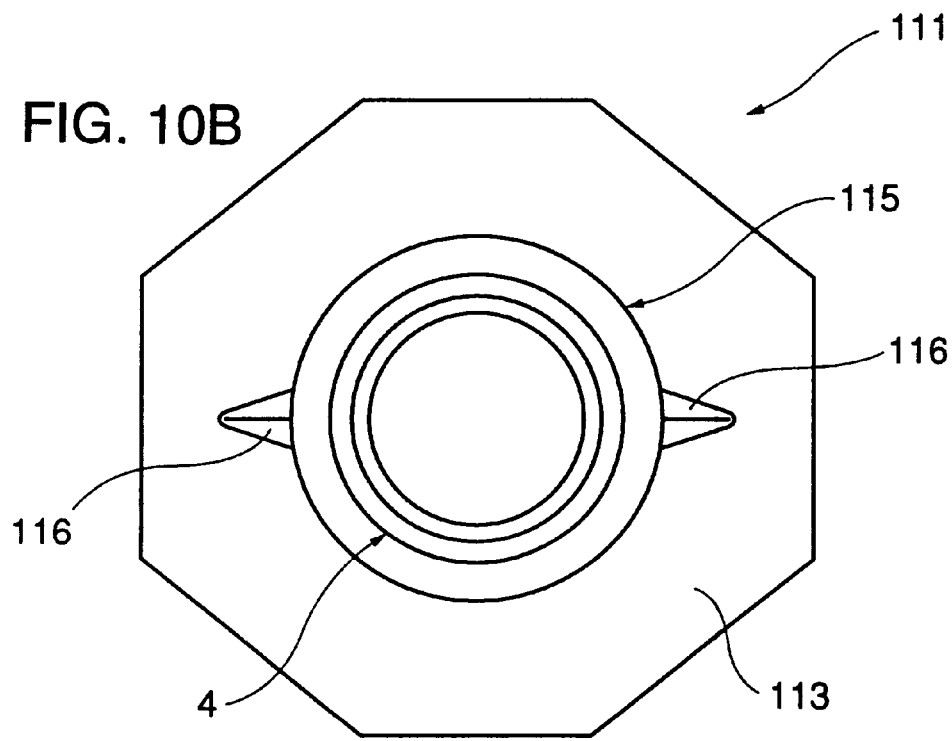
FIG. 10B is a plan view of the tee nut 111 shown in FIG. 10A.
Figure 12A:
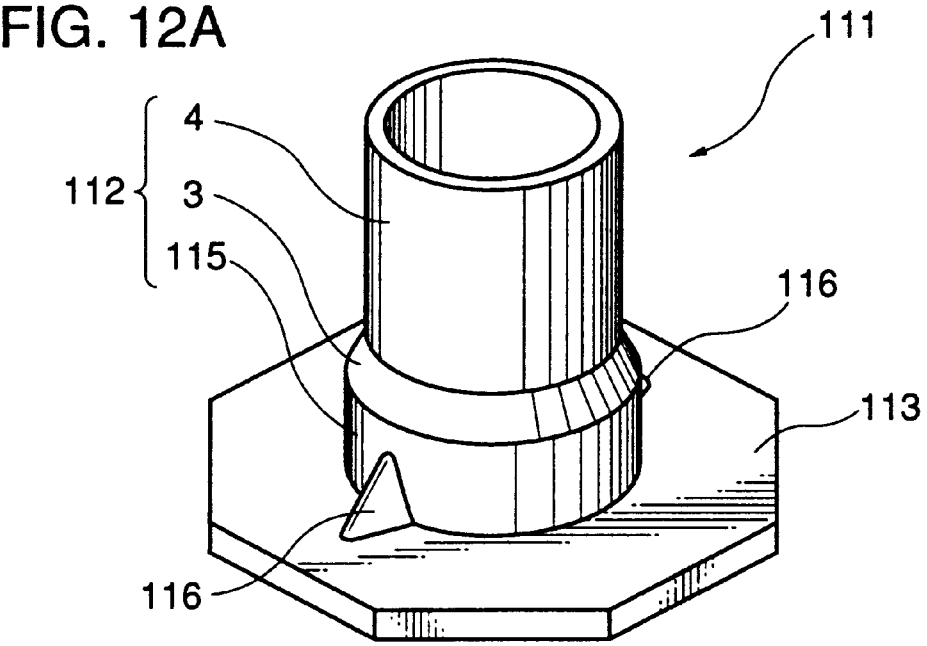
FIG. 12A is a perspective view of the tee nut 111 shown in FIGS. 10A and 10B.

A tee nut 111 according to an embodiment 5 of the present invention is now described with reference to FIGS. 10A, 10B and 12A. The tee nut 111 according to this embodiment is in common with the tee nut 41 according to the embodiment 1 in that a shaft portion 112 thereof has a step 3 with a predeterminate caulked part 34 and a female screw forming part 35 provided on a forward end side hollow cylindrical portion 4. The tee nut 111 is different from the tee nut 41 in that substantially triangular projections 116 are provided on a pair of positions opposite to each other at 180° in the vicinity of the boundary between a flange portion 113 and the outer periphery of a base end side enlarged cylindrical portion 115, located between the step 3 and the flange portion 113. These projections 116 are formed integrally with the base end side enlarged cylindrical portion 115 and the flange portion 113 to bite into a plate when the tee nut 111 is driven into the plate, for serving as detents for the tee nut 111. While the projections 116 are provided on two portions in the tee nut 111 according to this embodiment, the detent function can be further reinforced by properly increasing the number of such projections 116 as needed.

Figure 11A:
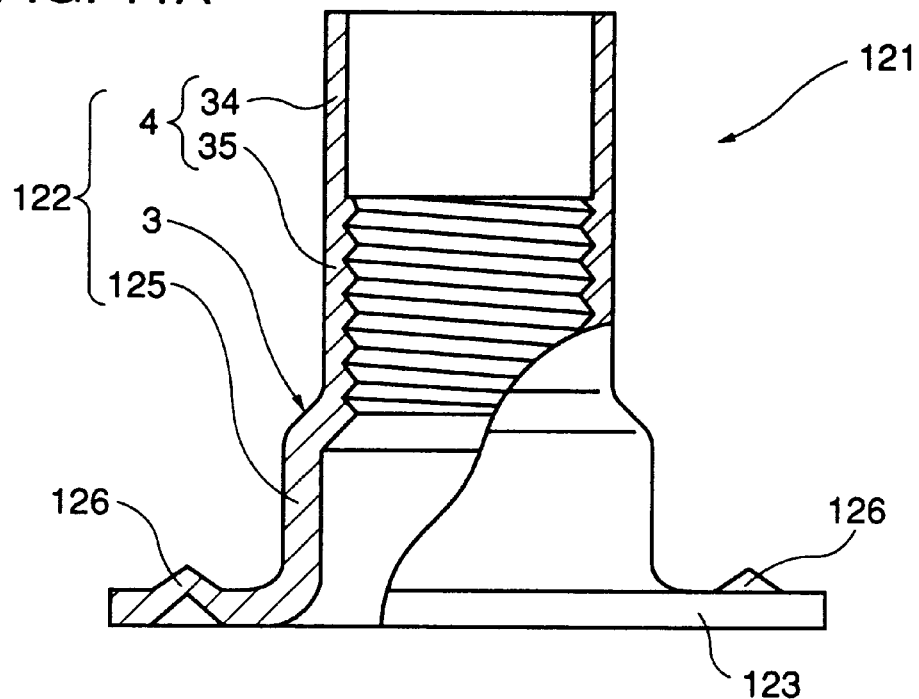
FIG. 11A is a central longitudinal sectional view of a tee nut 121 according to a modification of the embodiment 5 of the present invention.
Figure 11B:
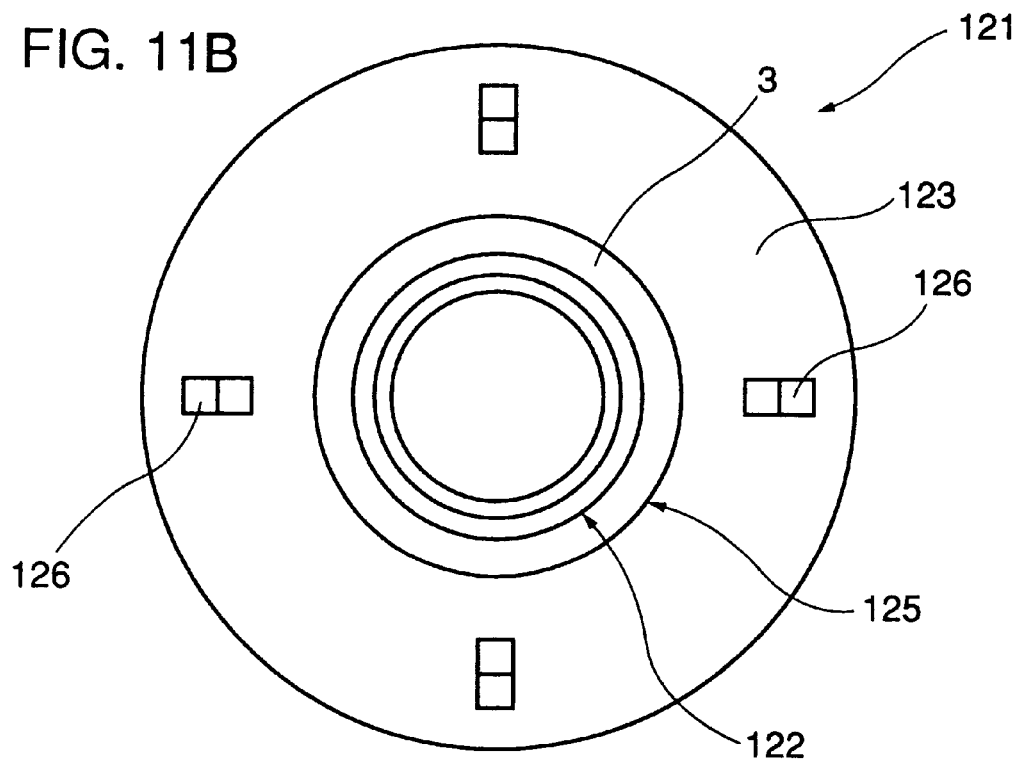
FIG. 11B is a plan view of the tee nut 121 shown in FIG. 11A.
Figure 12B:
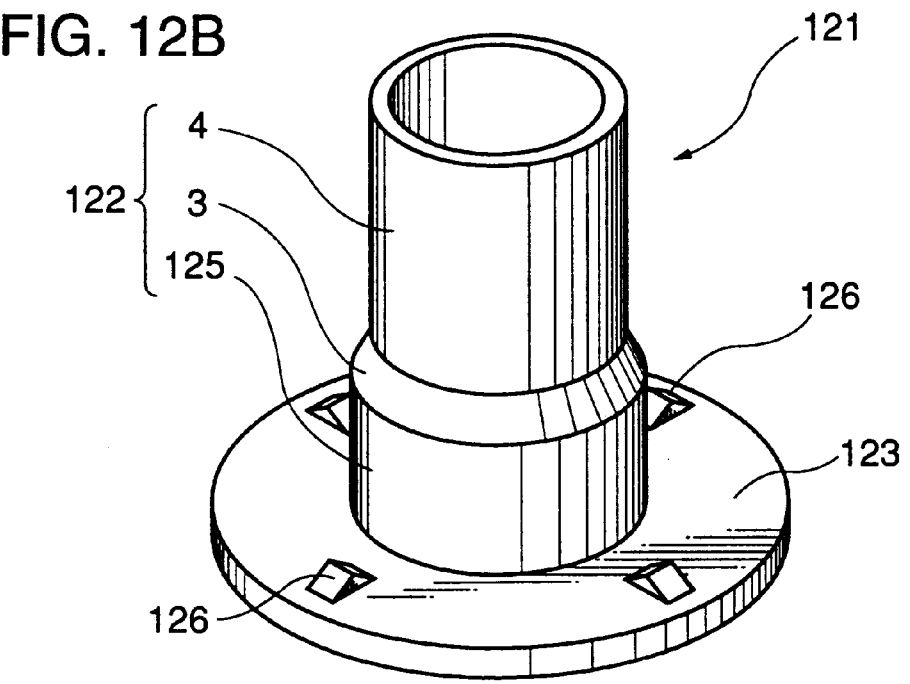
FIG. 12B is a perspective view of the tee nut 121 shown in FIGS. 11A and 11B.

In place of the projections 116 of the tee nut 111, projections 126 may be formed integrally on a discoidal flange portion 123 by providing pairs of slits in parallel with the flange portion 123 and pushing up the portions held therebetween while forming a base end side enlarged cylindrical portion 125 in a hollow cylindrical state similarly to that of the tee nut 41 for attaining a detent function for a tee nut 121 similarly to the projections 116 of the tee nut 111, as shown in FIGS. 11A, 11B and 12B. While the projections 126 are provided on four portions of the flange portion 123 in the tee nut 121 at regular intervals, the number and positions of the projections 126 can be properly changed as needed, as a matter of course.

Embodiment 6

Figure 13A:
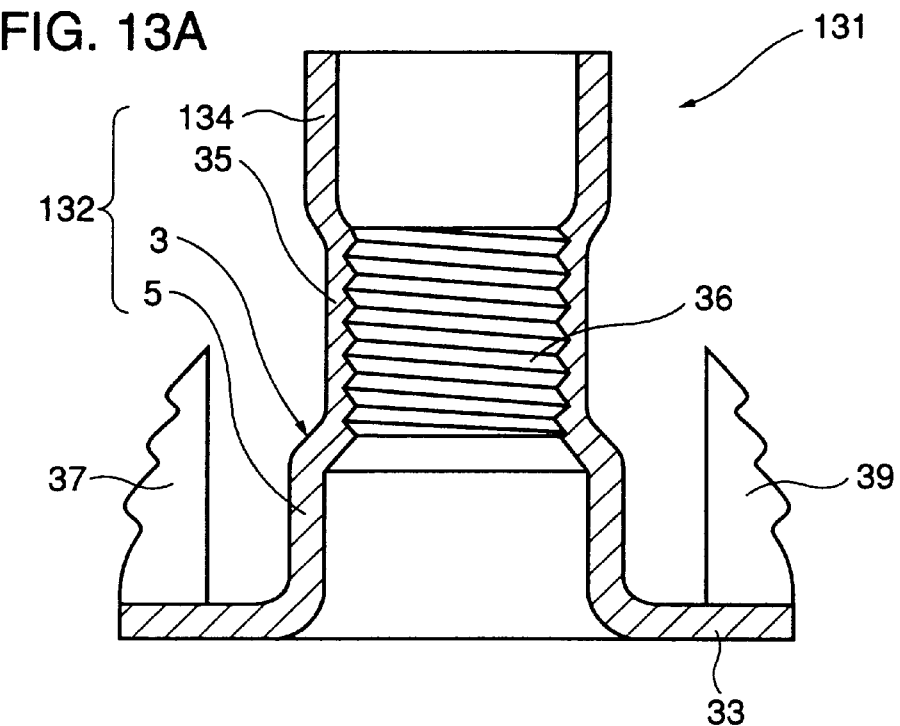
FIG. 13A is a central longitudinal sectional view of a tee nut 131 according to an embodiment 6 of the present invention.

The structure of a tee nut 131 according to an embodiment 6 of the present invention is now described with reference to FIG. 13A. Referring to FIG. 13A, elements similar to those of the tee nut 41 according to the embodiment 1 are denoted by the same reference numerals, to omit redundant description.

In this embodiment, the present invention is applied to a tee nut described in U.S. Pat. No. 5,618,144. The tee nut 131 according to this embodiment is in common with the tee nut according to each of the aforementioned embodiments in that it is the so-called rivet type tee nut and the structure thereof is substantially similar to that of the tee nut 41 according to the embodiment 1, and hence common elements thereof are denoted by reference numerals similar to those for the tee nut 41, to omit redundant description.

The tee nut 131 according to this embodiment is different from the tee nut 41 in that a predeterminate caulked part 134 of a shaft portion 132 thereof has an inner diameter larger than that of a female screw forming part 35 and an outer diameter larger than that of the female screw forming part 35.

In case of this tee nut 131, the diameter of a prepared hole formed in a plate employed as an object must be larger than at least the outer diameter of the predeterminate caulked part 134 and hence a clearance is defined between the female screw forming part 35 and the inner periphery of the prepared hole when the tee nut 131 is driven into the plate, while the predeterminate caulked part 134 is caulked for fixing the tee nut 131 to the plate and pawls 37 and 39 bite into the plate for serving as detents.

Figure 13B:
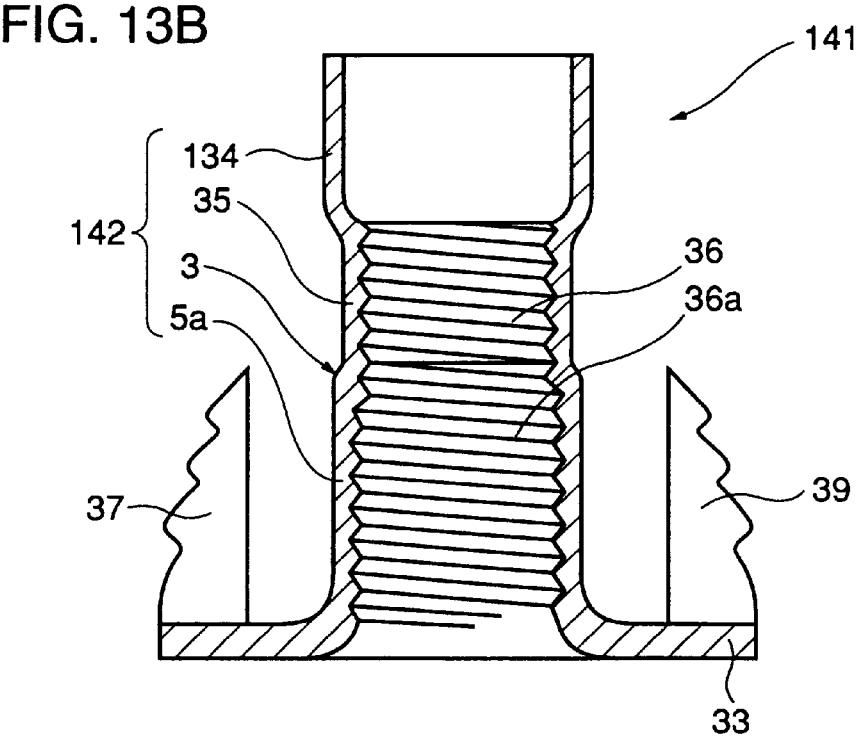
FIG. 13B is a central longitudinal sectional view of a tee nut 141 according to a modification of the embodiment 6 of the present invention.
Figure 14A:
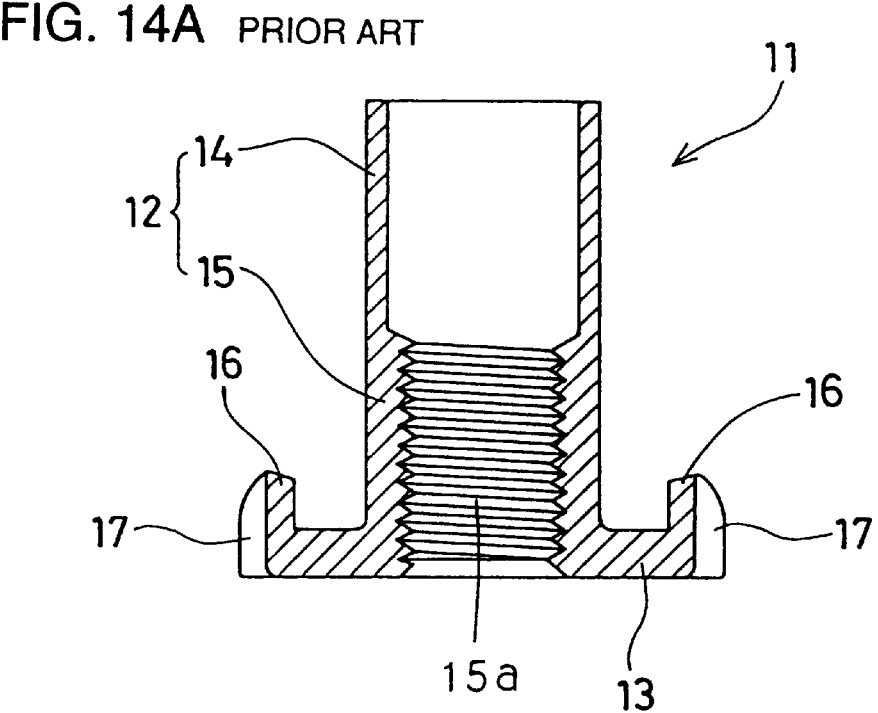
FIG. 14A is a central longitudinal sectional view showing a conventional tee nut 11, described in U.S. Pat. No. 5,238,344, having a round flange portion and a shaft portion provided with a thin part to be caulked.
Figure 14B:
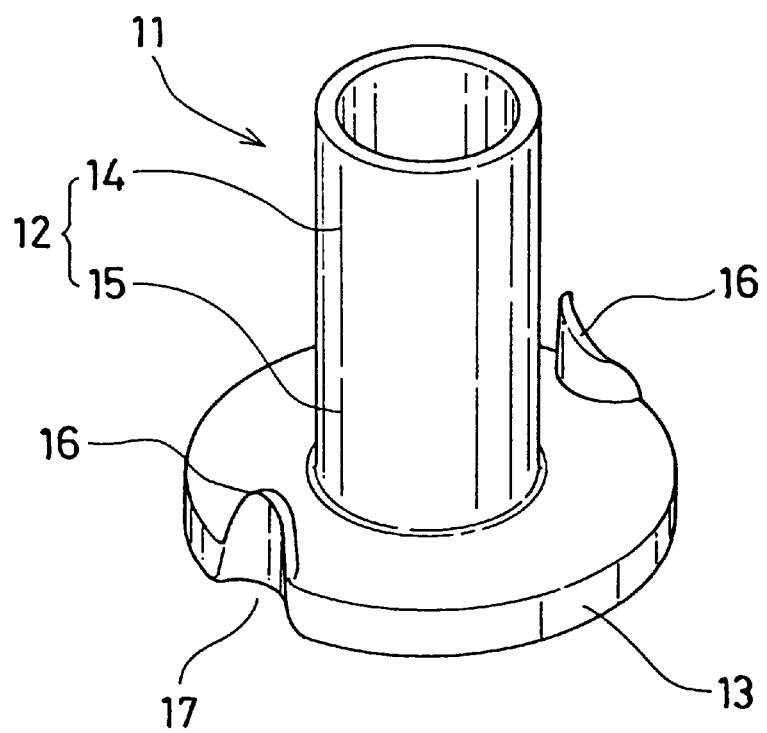
FIG. 14B is a perspective view of the tee nut 11 shown in FIG. 14A.

As shown in FIG. 13B, a part of this embodiment excluding a predeterminate caulked part 134 of a shaft portion 142 is applicable to a tee nut similar in structure to that of the tee nut 61 shown in FIGS. 3A and 3B as in a tee nut 141 shown in FIG. 13B, as a matter of course. Further, an inner peripheral lower end of a base end side hollow cylindrical portion 5a of the tee nut 141 shown in FIG. 13B continuous to a flange portion 33 may be substantially perpendicularly formed similarly to that of the tee nut 61 shown in FIG. 3B, so that a female screw is formed up to the inner peripheral lower end of the base end side hollow cylindrical portion 5a.

Figure 19A:
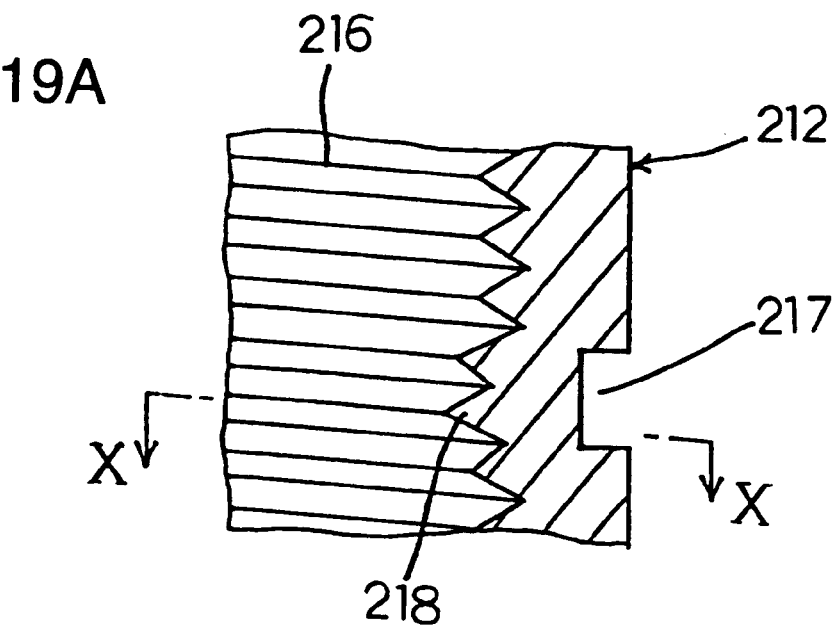
FIG. 19A is a partially fragmented sectional view showing the structure of a partially irregularized female screw forming part of a tee nut in an enlarged manner.
Figure 19B:
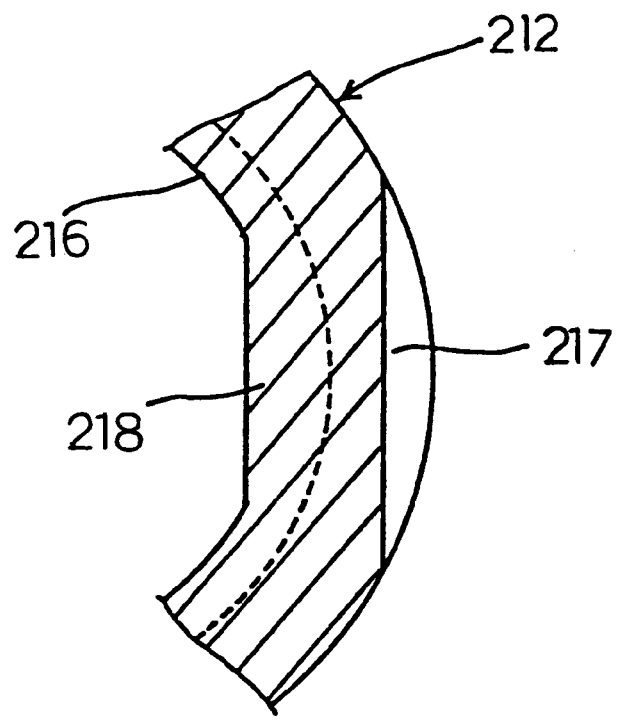
FIG. 19B is a sectional view taken along the line X—X in FIG. 19A.

In the tee nut according to each of the aforementioned embodiments, the thread is preferably partially irregularized in the region formed with the female screw, as lock means for preventing loosening of a bolt fitted with the female screw. In order to partially irregularize the thread, the outer peripheral surface of a female screw forming part 216 may be partially crushed inward for forming a concave part 217 in a shaft portion 212 of a tee nut, as shown in FIGS. 19A and 19B, for example. A pair of such concave parts 217 are provided at an angular interval of 180°, for example. These concave parts 217 are formed by holding prescribed portions of the female screw forming part 216 with a pair of proper tools and strongly pressing these tools against the female screw forming part 216. Thus, an irregularized part 218 is so formed that the bolt fitted with the tee nut cannot pass unless relatively strongly rotated, whereby the bolt is locked in the fitted state and prevented from loosening.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tee nut comprising a shaft portion and a flange portion outwardly extending from a first end of said shaft portion, made of an integral metal material, wherein
said shaft portion includes a step provided at an intermediate position along an axial length of said shaft portion, a forward end side cylindrical portion located between said step and a second end opposed to said first end, and a base end side enlarged cylindrical portion, having an inner periphery larger than an inner diameter of said forward end side cylindrical portion and an outer periphery larger than an outer diameter of said forward end side cylindrical portion, located between said step and said flange portion, and
said forward end side cylindrical portion includes a predeterminate caulked part formed over a prescribed length from said first end and a female screw forming part, having an inner diameter smaller than an inner diameter of said predeterminate caulked part, at least partially provided with a female screw thread and located in a region closer than said predeterminate caulked part to said step.

2. The tee nut in accordance with claim 1, wherein said base end side enlarged cylindrical portion is in the form of a hollow cylinder having inner and outer diameters respectively larger than inner and outer diameters of said forward end side cylindrical portion.

3. The tee nut in accordance with claim 1, wherein said base end side enlarged cylindrical portion has a polygonal outer peripheral shape as viewed along an axial direction of said shaft portion.

4. The tee nut in accordance with claim 1, wherein said flange portion includes a flange and a pawl or a projection projecting from said flange toward said second end.

5. The tee nut in accordance with claim 2, wherein said female screw thread extends continuously from said female screw forming part of said forward end side cylindrical portion along said inner periphery of said base end side enlarged cylindrical portion over a prescribed length from said step.

6. The tee nut in accordance with claim 1, wherein said predeterminate caulked part has a smaller wall thickness than said female screw forming part.

7. The tee nut in accordance with claim 1, further comprising an annular concave groove on at least either the outer periphery or the inner periphery of said shaft portion in the vicinity of a boundary between said predeterminate caulked part and said female screw forming part.

8. The tee nut in accordance with claim 1, wherein said predeterminate caulked part of said shaft portion has an outer diameter larger than an outer diameter of said female screw forming part.

9. The tee nut in accordance with claim 1, wherein said female screw thread is partially irregularized.

10. The tee nut in accordance with claim 1, wherein said intermediate position at which said step is provided is displaced axially along said axial length away from said flange portion and away from an end part of said base end side enlarged cylindrical portion adjoining said flange portion.

11. A one-piece integral metal tee nut comprising a hollow shaft extending along an axial direction and having opposite first and second ends, and a flange integrally joined to and protruding radially outwardly from said first end of said shaft, wherein:
said shaft includes a step at an intermediate location along an axial length of said shaft in said axial direction, a base end portion extending along said axial direction from said first end to said step, and a front end portion extending along said axial direction from said step to said second end;
said front end portion includes a threaded portion that has a female screw thread therein and that extends along said axial direction from said step to a boundary, and a caulkable portion that is adapted to have at least a part thereof deformed by caulking and that extends along said axial direction from said boundary to said second end;

said base end portion has an inner surface with a first inner dimension and an outer surface with a first outer dimension;

said threaded portion has a second inner diameter that is smaller than said first inner dimension, and a second outer diameter that is smaller than said first outer dimension;

said caulkable portion has a third inner diameter larger than said second inner diameter; and said step comprises a transition between said first inner dimension and said second inner diameter and between said first outer dimension and said second outer diameter.

12. The tee nut according to claim 11, wherein said caulkable portion has a third outer diameter equal to said second outer diameter, and wherein said front end portion has a uniform circular cylindrical outer surface extending entirely from said step to said second end.

13. The tee nut according to claim 11, wherein said caulkable portion has a third outer diameter greater than said second outer diameter, when said caulkable portion is in an original uncaulked form.

14. The tee nut according to claim 11, wherein said base end portion including said outer surface extends from said flange to said step in said axial direction toward said second end, and said step is axially displaced away from said flange in said axial direction.

15. The tee nut according to claim 11, wherein said step and said base end portion do not have a female thread therein.

16. The tee nut according to claim 11, wherein said step and said base end portion have a female thread therein extending continuously from said female thread in said threaded portion.

* * * * *

UNITED STATES PATENT AND TRADEMARK OFFICE
CERTIFICATE OF CORRECTION

PATENT NO.   : 6,109,849

DATED        : August 29, 2000

INVENTOR(S)  : Nagayama

It is certified that error appears in the above-identified patent and that said Letters Patent is hereby corrected as shown below:

On the Title Page: under [56], References Cited, U.S. PATENT DOCUMENTS",
        line 4, after "3/1993", replace "Nagatana" by --Nagayama--;

under [57] ABSTRACT,
        line 4, after "at", delete "on".

Signed and Sealed this

Seventeenth Day of April, 2001

Attest:

NICHOLAS P. GODICI

*Attesting Officer*     Acting Director of the United States Patent and Trademark Office